(12) United States Patent
Taylor

(10) Patent No.: US 8,387,006 B1
(45) Date of Patent: Feb. 26, 2013

(54) SYSTEM AND METHOD FOR AUTHORING A WEB PAGE TO BE RUN-TIME EDITABLE

(75) Inventor: Jorge Taylor, Burlingame, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1234 days.

(21) Appl. No.: 11/951,177

(22) Filed: Dec. 5, 2007

(51) Int. Cl.
*G06F 9/44* (2006.01)

(52) U.S. Cl. ...................................................... 717/110

(58) Field of Classification Search ..................... None
See application file for complete search history.

(56) References Cited

U.S. PATENT DOCUMENTS

| | | | |
|---|---|---|---|
| 6,529,910 B1 * | 3/2003 | Fleskes ........................ | 707/770 |
| 6,560,633 B1 * | 5/2003 | Roberts et al. ................ | 709/202 |
| 7,316,003 B1 * | 1/2008 | Dulepet et al. ................ | 717/111 |
| 7,978,618 B2 * | 7/2011 | Richardson et al. .......... | 370/252 |
| 2003/0074634 A1 | 4/2003 | Emmelmann | |
| 2004/0148576 A1 * | 7/2004 | Matveyenko et al. ........ | 715/530 |
| 2004/0205567 A1 * | 10/2004 | Nielsen ......................... | 715/513 |
| 2004/0217985 A9 * | 11/2004 | Ries et al. ..................... | 345/740 |
| 2004/0268231 A1 * | 12/2004 | Tunning ........................ | 715/513 |
| 2005/0102629 A1 * | 5/2005 | Chen et al. .................... | 715/770 |
| 2007/0157078 A1 | 7/2007 | Anderson | |
| 2007/0208751 A1 * | 9/2007 | Cowan et al. .................. | 707/10 |
| 2009/0006451 A1 * | 1/2009 | Estrada ......................... | 707/102 |

OTHER PUBLICATIONS

U.S. Appl. No. 11/951,165, filed Dec. 5, 2007.
Office Action dated Sep. 1, 2011 in related U.S. Appl. No. 11/951,165.
United States Patent and Trademark Office, Office Action, U.S. Appl. No. 11/951,165, dated Feb. 16, 2012, 22 pages.

\* cited by examiner

*Primary Examiner* — Wei Zhen
*Assistant Examiner* — Adam R Banes
(74) *Attorney, Agent, or Firm* — Kilpatrick Townsend & Stockton LLP

(57) ABSTRACT

Systems and methods are provided for authoring a web page to be run-time editable. A software code authoring tool is provided that enables authoring of web page source code that defines run-time edit capabilities that are permitted for editing content of the output presentation of the page. An improved content management solution is thus provided that enables a user-friendly way for a designer's customers (or other authorized users) to edit content of the output presentation of a page, while providing the designer the ability to control the amount of edit capability of the page that the customer is afforded. For instance, an authoring tool enables the designer to designate in the web page source code certain portions of the page that are to be run-time editable by an authorized user, wherein the designated portions may be edited by a user by interacting with a run-time output presentation of the page.

28 Claims, 23 Drawing Sheets

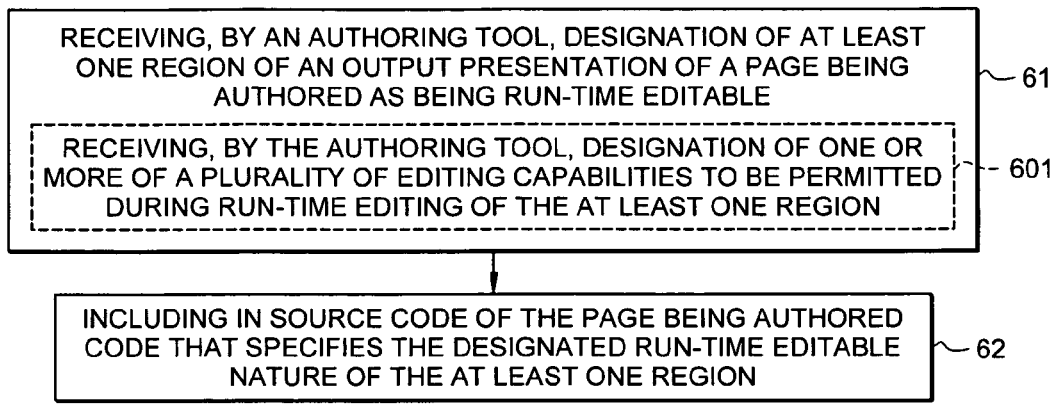
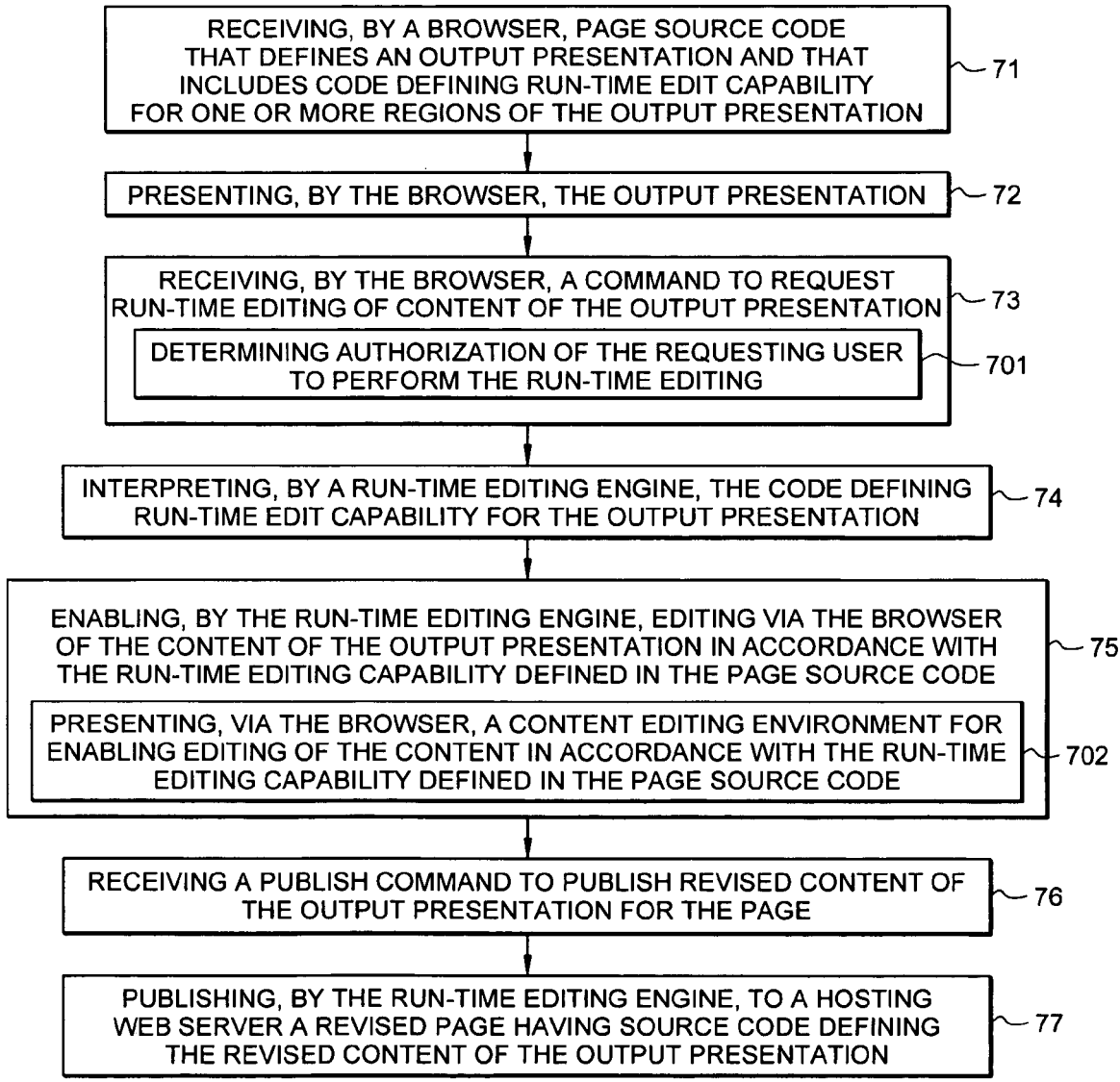

SYSTEM AND METHOD FOR AUTHORING A WEB PAGE TO BE RUN-TIME EDITABLE

CROSS-REFERENCE TO RELATED APPLICATIONS

The present application is related to concurrently filed and commonly assigned U.S. patent application Ser. No. 11/951,165 titled "SYSTEMS AND METHODS FOR RUN-TIME EDITING OF A WEB PAGE," the disclosure of which is hereby incorporated herein by reference.

TECHNICAL FIELD

The following description relates generally to software code authoring tools, and more specifically to software code authoring tools that enable authoring of web page source code that defines run-time edit capabilities that are permitted for editing content of the output presentation of the page.

BACKGROUND

Many software development tools are available today for use by software designers (or "developers") in creating various types of software applications. Software "designers" and "developers" are used interchangeably herein, and generally refer to anyone involved with using a software development tool (or "authoring tool") for authoring a software application. Authoring may include coding, designing, and/or otherwise creating or modifying the software application. A software application, as used herein, generally refers to any application that may be executed by a processor (or interpreter of some type) in order to perform operations defined by the instructions of the software application, including as an example presenting a user interface to a display. One example of such a software application is a web page, which may be defined in a markup language, such as HTML, XML, etc., JAVA, and/or other underlying page source code that may be read and interpreted by a browser to generate a corresponding output presentation of the web page to a display.

In a software development environment, a developer may interact with a software development tool for writing code, compiling the code, testing or debugging the code, and packaging the resulting application for deployment in a run-time environment. The software development tool may be implemented as a software application that is stored to a computer-readable medium and executed by a computer processor to perform the tasks associated with aiding a developer in the development of a software application. As one example, an integrated development environment (IDE) is commonly used for developing software applications. In general, an IDE is a programming environment that has been packaged as a software application program, typically including a code editor, a compiler, a debugger, and a graphical user interface (GUI) builder. The IDE may be a stand-alone application or may be included as part of one or more existing and compatible applications. IDEs provide a user-friendly framework for many modern programming languages, such as Visual Basic, Java, and PowerBuilder. IDEs for developing markup language (e.g., HTML, XML, etc.) applications are among the most commonly used.

Thus, IDEs provide software authoring tools that allow a developer (e.g., a web developer) to create web pages, websites, interactive applications, and the like for use by end users (e.g., visitors to websites). Various IDEs exist in the current marketplace, such as DREAMWEAVER®, available from Adobe Systems Incorporated, and FRONTPAGE®, available from Microsoft Corporation. DREAMWEAVER is one example of a software authoring tool that allows web developers to design Hypertext Markup Language (HTML) web pages in both a code editor and a graphical-based design time environment. DREAMWEAVER also allows the developer to design in other markup languages, such as, for example, Extensible Markup Language (XML), Extensible HTML (XHTML), Active Server Page (ASP), COLDFUSION™ Markup Language (CFML™), and the like.

Many software application authoring tools, as may be provided by an IDE, are available today for use by software developers in creating various types of software applications, including as examples such software code authoring tools as ADOBE® DREAMWEAVER® and MICROSOFT® FRONTPAGE®. Certain authoring tools, such as ADOBE® DREAMWEAVER®, allow a developer to create a document in an environment that includes both a text-based code view and a graphical-based design view. The code view renders the source code (e.g., markup language code) as text in a portion of the screen and allows the developer to see and manipulate the source code in the document file. For example, the developer may write and edit HTML or Cascading Style Sheets (CSS) code in the code view. The design view (or "display view"), on the other hand, is a What You See Is What You Get (WYSIWYG) view of the document that allows the user to visually manipulate the interpreted and graphically laid-out version of the document, such as, for example, by dragging, dropping, cutting, and pasting visual components. For instance, techniques similar to those employed by browsers may be employed for presenting the resulting output presentation (e.g., web page) of the underlying source code, wherein the developer may manipulate such output presentation within the design view. As the developer works, changes to the document are reflected in both the code view and the design view.

Once a designer creates source code (which may be referred to as a "source page"), such source code is typically stored to a web server that is accessible by clients via a communication network, such as the Internet. The clients may access the web server and download the source code, which a browser executing on the client's computer interprets to generate a corresponding output presentation, as is well known in the art.

Often, designers create web pages (e.g., using DREAMWEAVER or some other authoring tool) for customers who desire to make certain information, products, and/or services available to their clients via such web pages. The designers are typically responsible for authoring source code that, when interpreted by a browser, generates an output presentation having desired graphical layout, as well as containing desired content. The graphical layout may define such "look-and-feel" characteristics of the web page as the arrangement of regions of the page (such as the title of the page, sub-titles of regions contained in the page, sidebars of the page, etc.), color scheme of the page, sizes and/or fonts of text contained in various regions of the page, etc., whereas the content of the web page refers to the specific textual and/or graphical (e.g., pictures, images, etc.) information that is presented in each of the regions of the page.

It may be desirable to change the content of a web page from time to time. That is, a designer's customer may periodically desire to change the content of its web page to present different information, products, and/or services to its clients. Often, a customer may desire to change the content of its web page without altering the graphical layout of the page. Many customers change the content of a web page much more frequently than they change the graphical layout of the page.

As an illustrative example, suppose a designer creates a web page for a real estate company; from time to time, the real estate company may desire to change the content of its web page to reflect changes in its real estate listings (e.g., to add new listings of homes that are for sale and/or to remove old listings of homes that have sold, etc.). As another illustrative example, suppose a designer creates a web page for a news company; from time to time, the news company will desire to change the content of its web page to reflect recent news stories.

Traditionally, to make changes to a web page's content, the customer must submit the revised content to the designer, and the designer modifies the underlying source code of the web page such that its output presentation presents the revised content desired by the customer. Often, the designer agrees to a maintenance contract with the customer, wherein the designer agrees to accept content changes from the customer and modify the customer's web page source code to modify the web page's output presentation to reflect the desired content changes. The customer may email the designer a list of desired changes, and the designer then downloads to the designer's computer (from the hosting web server) the web pages to be modified, and the designer uses an authoring tool like DREAMWEAVER to modify the source code to make the content changes. The designer then pushes the modified source pages back up to the web server, and notifies the customer that the changes have been made so that the customer can review the changes to ensure that they are accurate. In this way, the designer remains integral to maintaining the customer's web page content.

Such web page "maintenance" tasks as updating the content of the customer's web page, while typically relatively simple to code for the designer, often become undesirable. For instance, the designer may be required to spend in inordinate amount of time performing maintenance on customer's web pages for updating their content, thus taking time away from other tasks such as attracting new customers, designing new web pages (e.g., for new customers), etc. Additionally, the designer may be a bottleneck to the updating of a customer's web page content. That is, the customer may have to wait an undesirably long time for the designer to update the page source code to implement desired content changes. This may ultimately lead to a point of contention or dissatisfaction in the relationship between the designer and customer.

One solution that has attempted to address this issue in the enterprise arena is the implementation of a content management system. In the enterprise arena, in which websites are being developed within a particular company (e.g., intranet websites that are meant for consumption within the particular company), the company may purchase and deploy a content management system in an attempt to aid maintenance of content on its intranet website. This allows a web designer to rollout the web page, and then various contributors may make changes to the web page's content using the content management system. In general, such content management systems are industrial strength, meant for the enterprise arena, and are undesirably expensive to purchase and implement. Such content management systems contain unnecessary complexity and expense than what is generally needed or desired in many instances, such as in an instance in which a relatively small web designer is working with a number of customers on a limited budget.

Another solution is to employ a client-side desktop application that enables the customer to modify content of the customer's web page. An example of one such client-side desktop application is CONTRIBUTE®, available from Adobe Systems Incorporated. In general, CONTRIBUTE is a software application for editing the content of a website, which allows a wide variety of people within an organization to update web pages by reducing the amount of web design skills necessary for the process. CONTRIBUTE enables non-programmers to modify content of a web page, as it employs an intuitive WYSIWYG development environment which allows those with little or no programming experience to update web page content.

Such a client-side desktop application as CONTRIBUTE is less complex and less expensive than the above-mentioned content management systems, thereby making it a more attractive solution for certain designers. However, there is a general resistance in the industry to use of such a desktop application for content editing. There is a perception by some customers that such a desktop application requires undesirable overhead in terms of deployment and training. That is, a designer's customer may resist employing such a desktop application in order to update the customer's web page content because of the perception that the customer will be required to expend a lot of effort in learning how to use the desktop application, and thus the customer may prefer instead to continue to simply submit content changes to the designer. Thus, customers are often resistant to learning how to use a new software application in order to update their web page content.

Another content editing solution that is known for web pages is the Wiki editing solution. In general, a Wiki is a server program that allows users to collaborate in forming the content of a web page, wherein any user can edit the site content using a regular web browser. A Wiki enables documents to be written collaboratively, in a simple markup language using a web browser. A Wiki is essentially a database for creating, browsing and searching information. Generally, there is no review before modifications are accepted. Many Wikis are open to the general public without the need to register any user account. Sometimes, session log-in is requested to acquire a 'wiki-signature" cookie for autosigning edits. Many edits, however, can be made in real-time, and appear almost instantaneously online.

Traditionally, content structure and formatting on wikis is implemented with a simplified markup language, sometimes known as "wikitext." For example, starting a line of text with an asterisk is often used to code an item in a bulleted list. Style and syntax of wikitexts can vary a great deal among wiki implementations, some of which also allow HTML tags.

While Wikis provide a collaborative solution that enable the public to co-author content of a page (and thus enables various contributors to impart their respective knowledge on a given subject to the page for the benefit of the public as a whole), Wikis are not employed by designers to enable the above-mentioned content maintenance by customers whose web pages are not intended to have collaborative authoring that is open to the public. Wikis are not an attractive solution for such content maintenance for several reasons. First, the editing experience provided by a Wiki oftentimes requires the user to create HTML, know HTML tags, or know a particular Wiki language for doing certain types of editing operations, such as bolding text or putting a ruler across the page. Thus, use of the editing environment provided by a Wiki may require the customer to learn a new editing language.

Additionally, the designer forfeits control over the web page edit-ability when employing a Wiki. In general, when a Wiki solution is employed, the users are capable of making many kinds of edits to the page. Designers often desire to maintain a degree of control over just how editable the page is by the customers. Wikis typically provide a very open-ended editing capability, which may enable a customer to perform editing on a web page beyond that which the designer would desire for the customer to be capable of performing. Accordingly, Wikis generally suffer from being too open ended from a designers perspective, while not providing a user-friendly editing experience from the customers perspective.

In view of the above, a desire exists for an improved content management solution that enables a user-friendly way for customers to update content, while providing a designer the ability to control the amount of edit-ability of the page that is afforded to the customer.

SUMMARY

The present invention is directed generally to systems and methods for authoring a web page to be run-time editable. According to certain embodiments, a software code authoring tool is provided that enables authoring of web page source code that defines run-time edit capabilities that are permitted for editing content of the output presentation of the page. Embodiments of the present invention provide an improved content management solution that enables a user-friendly way for a designer's customers (or other authorized users) to update content of the output presentation of a page, while providing the designer the ability to control the amount of edit capability (or "edit-ability") of the page that is afforded to the customer. For instance, according to certain embodiments, an authoring tool enables the designer to designate, in the web page source code, certain portions of the page that are to be run-time editable by an authorized user. As discussed further herein, the designated portions of the page may be edited by an authorized user (e.g., the designer's customer) by interacting with a run-time output presentation of the page, such as that presented by a standard browser.

Further, in certain embodiments, the authoring tool enables the designer to designate, in the web page source code, a level of edit capability that is afforded to the authorized user for a given portion of the page. That is, the designer may designate which of a plurality of editing functions (or "options"), such as edit formatting capabilities (e.g., bolding, underlining, italicizing, etc.), the authorized user is to be afforded when editing a given portion of the web page. For instance, the designer may designate that in a first region of the web page the authorized user is permitted to edit the text, but is unable to perform any formatting edits (e.g., bolding, underlining, etc.), whereas the designer may designate that in a second region of the web page the authorized user is permitted to edit the text as well as perform certain formatting edits. In this way, the designer may author source code that defines a level of edit-ability that is granted to an authorized user for editing the output presentation of the web page. As such, the designer can grant certain run-time editing capabilities to an authorized user (e.g., customer), thereby alleviating many content management tasks from the designer, while enabling the designer to maintain a desired amount of control over the editing functions that are granted to the authorized user. For instance, embodiments of the present invention enable page-controlled run-time editing of the content of a page's output presentation, wherein a designer can designate/define, in the source code of a page, the permitted run-time editing capabilities to be afforded to an authorized user.

Further, certain embodiments of the present invention enable a user-friendly editing environment in which non-programmers can easily edit content of a web page without being required to understand a coding language. According to certain embodiments, the authorized user (e.g., customer of the designer) can perform editing operations via a standard browser. As such, a separate client-side desktop application is not required to be employed by the user for editing the web page content, nor is a complex and expensive content management system required. As an example, according to one embodiment, an authorized user may access the web page in a browser, and may input a command (e.g., a "hot" key sequence) to trigger a run-time edit mode of the page. That is, while viewing the run-time output presentation of the page on the browser, the user may input a command such as a particular key sequence to trigger the edit mode. In response to the key sequence, a login may be presented to the user, and once the user's login information is received and confirmed that the user is authorized to edit the page, the user is permitted to perform the editing capabilities that have been afforded/defined by the designer (e.g., as defined in the source code for the page). In certain embodiments, responsive to the user triggering the edit mode (and successfully logging in), the user is presented an edit mode view of the output presentation of the page, which may provide certain editing tools, etc. to the user to aid the user in: a) recognizing which editing operations are authorized, and b) performing the authorized editing operations, as discussed further herein.

As discussed further herein, according to certain embodiments, one or more regions of an output presentation of a web page may be selected by a designer to be run-time editable. That is, the designer may interact with the authoring tool to select a region of the output presentation of a page being authored to be run-time editable. To make such region run-time editable, an attribute (e.g., "ice:editable") is inserted into the source code that defines the corresponding region. For instance, a "div" region of the page may be selected as run-time editable, whereby the designating attribute, ice:editable, is inserted into the code defining such "div" region to designate such "div" region as run-time editable. Additionally, a designer may interact with the authoring tool to designate run-time editing capabilities that are to be permitted for the selected region, such as by selecting which, if any, of a plurality of edit formatting capabilities (e.g., bolding, underlining, italicizing, etc.) are to be permitted. An attribute (e.g., "ice:editableoptions") that specifies the permitted run-time editing capabilities may be inserted into the source code that defines the selected region. For instance, a "div" region of the page may be selected as run-time editable, whereby the designating attribute, ice:editableoptions, is inserted into the code defining such "div" region in order to designate the run-time editing capabilities that are permitted for the region. Different run-time editing capabilities may be defined for different regions of a given page's output presentation.

According to certain embodiments, a run-time editing engine is operable to interpret the code (e.g., attributes) included in the page's source code that defines the run-time edit capabilities permitted for regions of the page's output presentation. For instance, in response to a user requesting to perform run-time editing of an output presentation of a page that is being presented on a browser, a run-time editing engine may (once determined that the requesting user is authorized) enable editing via the browser of the content of the output presentation in accordance with the run-time editing capability defined in the page's source code. For instance, in certain embodiments, the run-time editing engine presents, via the browser, a content editing environment for enabling run-time editing of the content in accordance with the run-time editing capability defined in the page's source code.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 6 shows an exemplary operational flow diagram for an authoring tool according to one embodiment of the present invention;

FIG. 7 shows an exemplary operational flow diagram for run-time editing of a page according to one embodiment of the present invention.

DETAILED DESCRIPTION

Figure 1A:
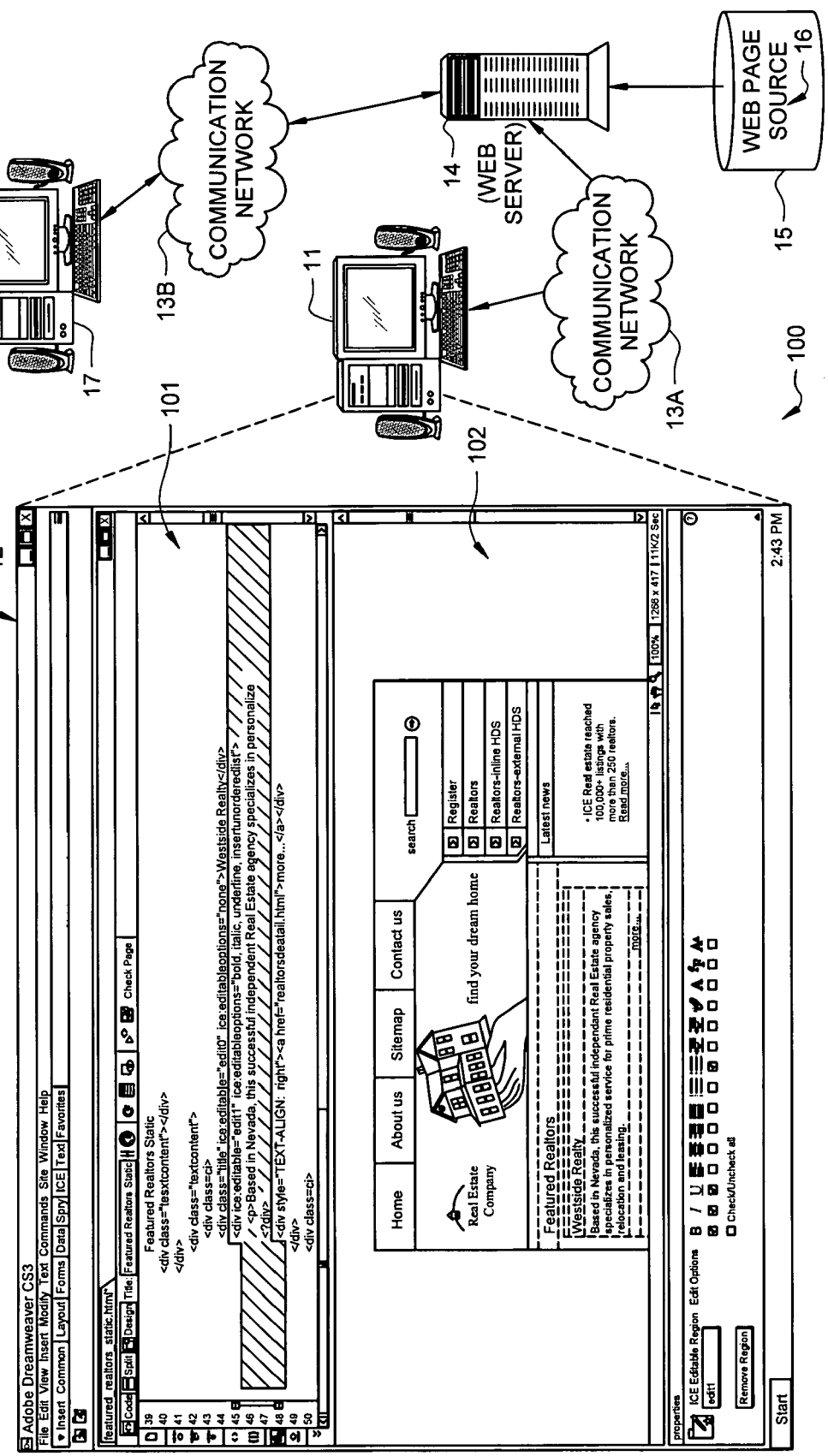
FIGS. 1A-1B show an exemplary system illustrating a common web page authoring and deployment technique of the prior art.
Figure 1B:
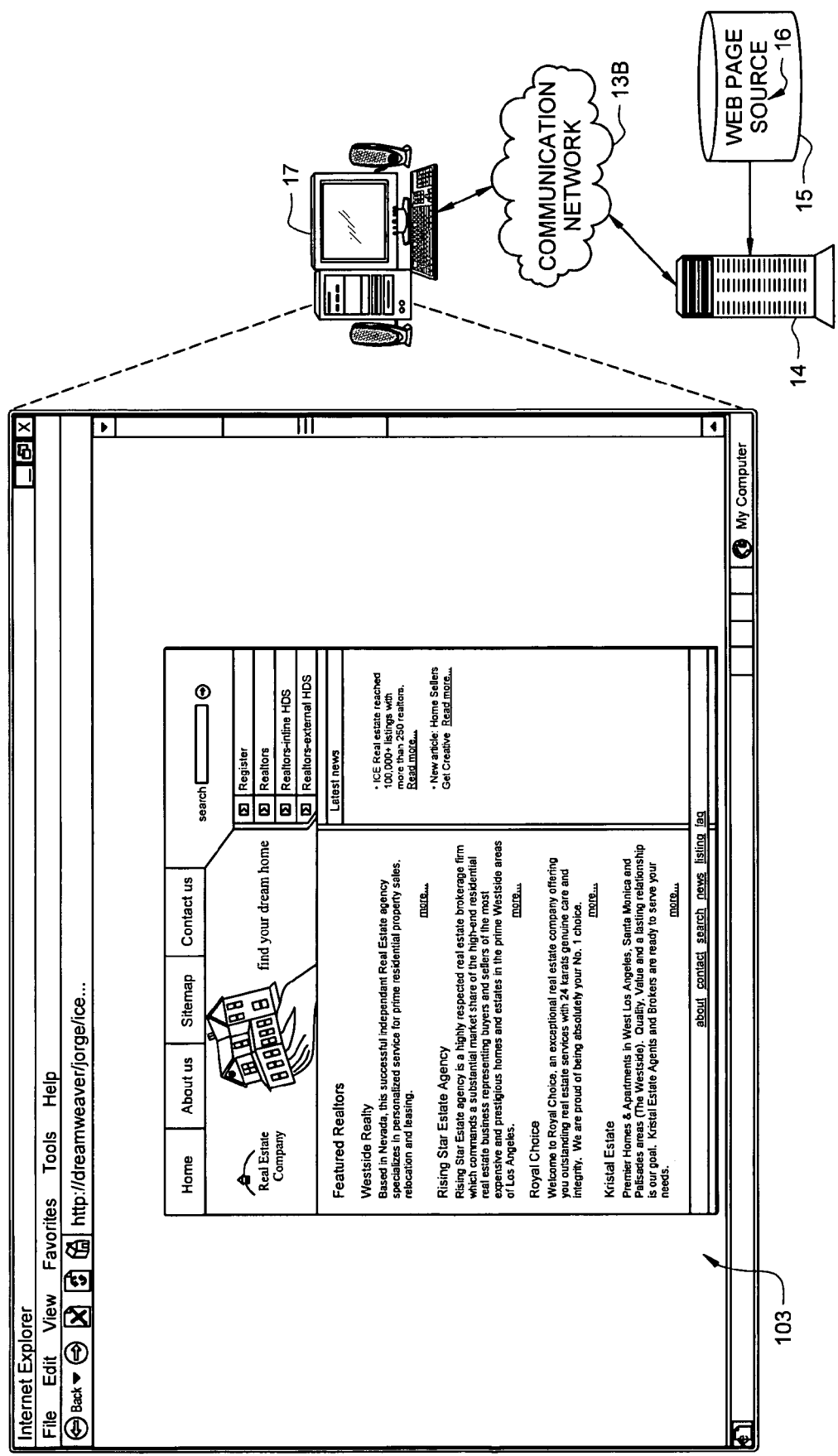

Turning to FIGS. 1A-1B, an exemplary system 100 illustrating a common web page authoring and deployment technique of the prior art is shown. As shown, system 100 comprises a first processor-based computer 11, such as a personal computer (PC), laptop computer, server computer, workstation computer, etc. In this example, a web authoring tool 12 is executing on computer 11. Authoring tool 12 comprises computer-executable software code stored to a computer-readable medium that is readable by a processor of computer 11 and, when executed by such processor, causes computer 11 to perform the various operations described further herein for such authoring tool 12. Examples of such a web authoring tool 12 include DREAMWEAVER®, available from Adobe Systems Incorporated, and FRONTPAGE®, available from Microsoft Corporation.

Authoring tool 12 may enable development of software code for web pages (e.g., as is commonly coded using such authoring tools as those included in DREAMWEAVER® and FRONTPAGE® mentioned above). In many cases, such authoring tool 12 enables an author (e.g., website designer) to create textual source code that defines a graphical presentation format to be generated by an outputting application (e.g., a web page output by a browser, etc.). Thus, a designer may interact with authoring tool 12 (via computer 11) to develop a web page for a customer, as discussed further below.

In this example, authoring tool 12 is operable to present one or more user interfaces with which a user (e.g., designer) may interact to author a document, such as a source code document (or "page source code") that defines a web page to be generated when read/interpreted by a browser. In this example, authoring tool 12 presents a code view interface 101 and a design view (or "display view") interface 102. Authoring tool 12 may employ technology similar to that employed by browsers to read a code document (e.g., of code view 101) and display in design view 102 the corresponding page that is generated from such code. Accordingly, such design view 102 may provide developers the ability to view and edit a web page in a visual mode in which the underlying source code (e.g., HTML code, XML code, CSS code, etc.) has been rendered, as if on a web browser. While the developer works on the rendered objects, the authoring tool 12 may translate and effect those changes in the underlying textual code document. Thus, design view 102 provides a design-time view of the output presentation of a web page being authored, which mimics a run-time view of the output presentation that would be presented for such web page by a browser. Such a design view 102 is a known interface that is available in certain authoring tools, such as in DREAMWEAVER®, available from Adobe Systems Incorporated.

In contrast, code view 101 provides a simple text editor in which the actual textual source code (e.g., HTML code, XML code, CSS code, etc.) defining a page to be generated is displayed to the user. Thus, code view 101 shows the textual code that defines the page to be generated when such code is read/interpreted (e.g., by a browser), while design view 102 shows the resulting generated page that is rendered when the underlying code is read/interpreted (e.g., by a browser).

Once a designer creates source code for a page via authoring tool 12, such source code is typically stored to a hosting web server 14. For instance, the source code for a web page may be pushed from computer 11 to web server 14 via a communication network 13A, such as a local area network (LAN), the Internet or other wide area network (WAN), etc. Alternatively, the source code may otherwise be loaded onto web server 14, and/or computer 11 and web server 14 may be one in the same. The source code 16 for the web page is stored to data storage 15 of web server 14. Data storage 15 may comprise a hard disk and/or other computer-readable data storage medium that is operable for storing data.

Web server 14 is accessible by clients, such as client computer 17, via a communication network 13B, such as the Internet. As shown further in FIG. 1B, a client, such as client computer 17, may access web server 14 and download the source code 16, which a browser 18 executing on the client computer 17 interprets to generate a corresponding output presentation 103. Thus, a run-time output presentation of the page source code 16 that is hosted on web server 14 can be presented by browser 18 executing on the client computer 17. Accordingly, a designer may create a web page's source code 16 via authoring tool 12 for a customer, which when deployed on web sever 14 enables clients 17 to access the web page, thus enabling such clients 17 to view a run-time output presentation 103 of the page to obtain information, products, services, etc. from the customer.

As discussed above, difficulty has existed in maintaining content of a customer's website. Embodiments of the present invention provide an improved content management solution that enables a user-friendly way for customers to update content, while providing a designer the ability to control the amount of edit capability (or "edit-ability") of the page that is afforded to the customer. For instance, according to certain embodiments, an authoring tool enables the designer to designate, in the web page's source code, certain portions of the page that may be edited by an authorized user. As discussed further herein, the designated portions of the page may be edited by an authorized user (e.g., the designer's customer) by interacting with a run-time output presentation of the page, such as that presented by a browser 18 (FIG. 1B).

Further, in certain embodiments, the authoring tool enables the designer to designate, in the web page's source code, a level of edit capability that is afforded to the authorized user for a given portion of the page. That is, the designer may designate which of a plurality of editing functions (or "options") the authorized user is to be afforded when editing a given portion of the web page. For instance, the designer may designate that in a first region of the web page the authorized user is permitted to edit the text, but is unable to perform any formatting edits (e.g., bolding, underlining, etc.), whereas the designer may designate that in a second region of the web page the authorized user is permitted to edit the text as well as perform certain formatting edits. In this way, the designer may author source code that defines a level of edit-ability that is granted to an authorized user for editing the output presentation of the web page. As such, the designer can grant certain editing capabilities to an authorized user (e.g., customer), thereby alleviating many content management tasks from the designer, while enabling the designer to maintain a desired amount of control over the editing functions that are granted to the authorized user.

Further, certain embodiments of the present invention enable a user-friendly editing environment in which non-programmers can easily edit content of a web page without being required to understand a coding language. According to certain embodiments, the authorized user (e.g., customer of the designer) can perform editing operations via a standard browser. As such, a separate client-side desktop application is not required to be employed by the user for editing the web page content, nor is a complex and expensive content management system required. As an example, according to one embodiment, an authorized user may access the web page in a browser, and may input a command (e.g., a "hot" key sequence) to trigger an edit mode of the page. That is, while viewing the run-time output presentation of the page on browser 18, the user may input a command such as a particular key sequence to trigger the edit mode. In response to the key sequence, a login may be presented to the user, and once the user's login information is received and confirmed that the user is authorized to edit the page, the user is permitted to perform the editing capabilities that have been afforded/defined by the designer (e.g., as defined in the source code for the page). In certain embodiments, responsive to the user triggering the edit mode (and successfully logging in), the user is presented an edit mode view of the output presentation of the page, which may provide certain editing tools, etc. to the user to aid the user in: a) recognizing which editing operations are authorized, and b) performing the authorized editing operations, as discussed further herein.

Figure 2:
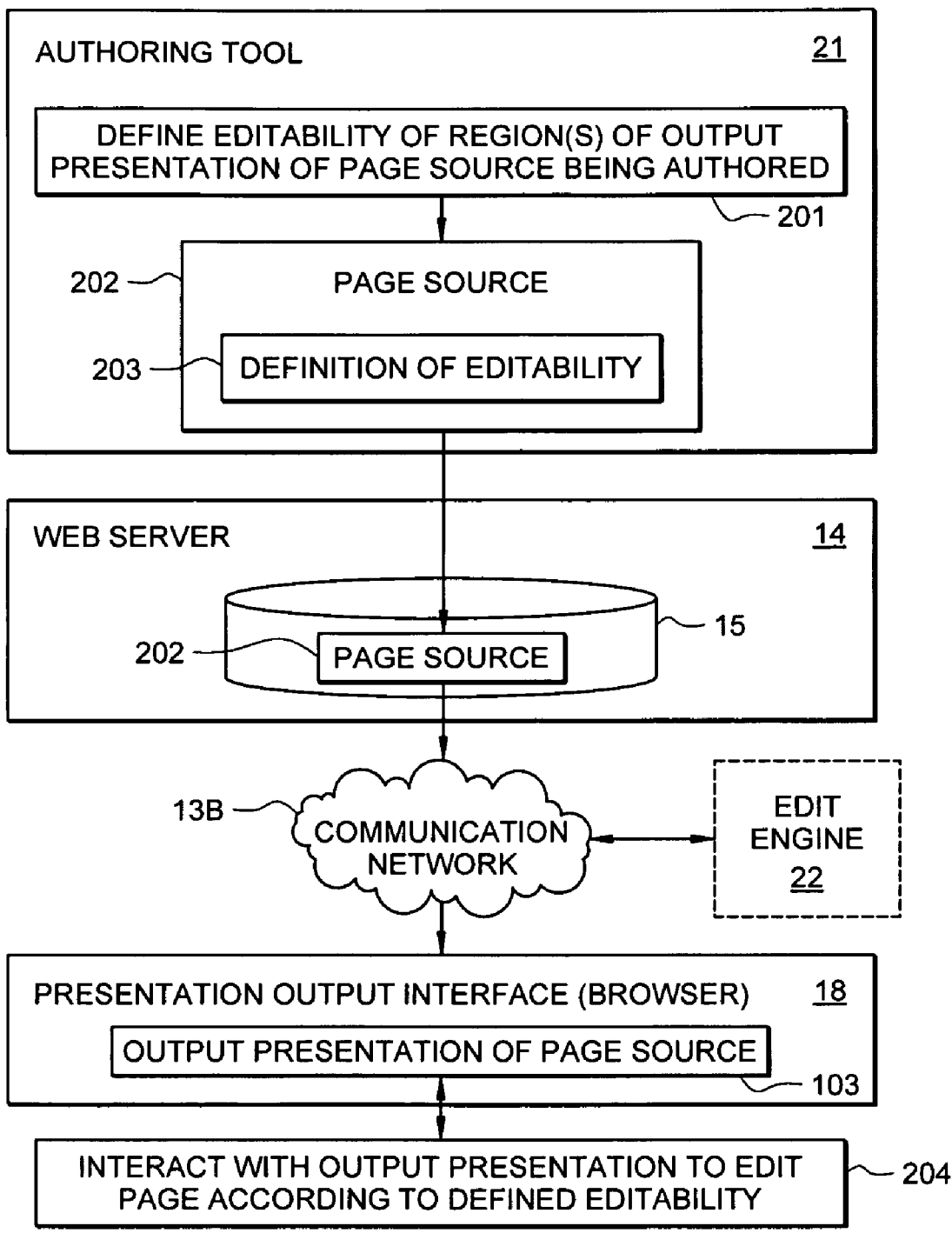
FIG. 2 shows a block diagram of an exemplary system according to one embodiment of the present invention.

Turning now to FIG. 2, a block diagram of an exemplary system 200 according to one embodiment of the present invention is shown. As shown, system 200 comprises software code authoring tool 21, such as DREAMWEAVER, which is executing on a processor-based device, such as computer 11 of FIG. 1A. As with authoring tool 12 of FIG. 1A, authoring tool 21 comprises computer-executable software code stored to a computer-readable medium that is readable by a processor of a computer, such as computer 11, and when executed by such processor, causes the computer to perform the various operations described further herein for such authoring tool 21. As with the example of FIG. 1A, authoring tool 21 may enable development of software code for web pages (e.g., as is commonly coded using such authoring tools as those included in DREAM WEAVER® and FRONTPAGE® mentioned above). In many cases, such authoring tool 21 enables an author to create textual code that defines a graphical output presentation format to be generated by an outputting application (e.g., a web page output by a browser).

As with the above example of FIG. 1A, authoring tool 21 is operable to present one or more user interfaces with which a user (e.g., designer) may interact to author a document, such as a source code document that defines a web page to be generated when read/interpreted by a browser. According to this exemplary embodiment, a designer interacts with authoring tool 21 to author page source code 202. As with authoring tool 12 of FIG. 1A, authoring tool 21 may present a code view interface 101 and a design view interface 102 with which a designer may interact to author page source code 202. According to this exemplary embodiment, authoring tool 21 enables a designer to, in operational block 201, define a run-time edit capability of one or more regions of an output presentation of the page source code being authored. In this exemplary embodiment, such run-time edit capability is defined, as definition(s) 203, within the page source code 202. For instance, authoring tool 21 enables the designer to designate, in the web page source code 202 (via definition(s) 203), certain portions of the page that may be edited by an authorized user. Further, in certain embodiments, authoring tool 21 enables the designer to designate, in the web page source code 202 (via definition(s) 203), a level of run-time edit capability that is afforded to the authorized user for a given portion of the page. That is, the designer may designate which of a plurality of editing functions (or "options") the authorized user is to be afforded when editing a given portion of the web page.

As with the example of FIGS. 1A-1B, the page source code 202 may be stored to data storage 15 of a hosting web server 14, whereby the page source code 202 is accessible to clients (e.g., client 17 of FIG. 1) via communication network 13B. For instance, as with FIG. 1B, a client, such as client computer 17, may access web server 14 and download the source code 202, which a browser 18 executing on the client computer 17 interprets to generate a corresponding run-time output presentation 103. According to this exemplary embodiment of the present invention, an authorized user of the run-time presentation output interface (e.g., browser) 18 may, in operational block 204, interact with the output presentation 103 to edit the page according to the defined run-time edit capability 203. That is, the authorized user may edit the content of the output presentation 103, as described further herein, by performing permitted editing operations as defined in the definition of run-time edit capability 203.

Turning to FIGS. 3A-3H, an exemplary scenario of using an exemplary authoring tool 21 according to an embodiment of the present invention for defining run-time edit capability of a web page is shown. FIGS. 3A-3H show an exemplary authoring tool 21, which comprises computer-executable software code stored to a computer-readable medium that is readable by a processor of a computer 11 and, when executed by such processor, causes computer 11 to perform the various operations described further herein for such authoring tool 21. Authoring tool 21 presents a user interface with which a designer may interact to author a page's source code. That is, a designer may interact with authoring tool 21 (via computer 11) to develop a web page for a customer. In this example, authoring tool 21 is operable to present one or more user interfaces with which a user (e.g., developer) may interact to author a document, such as a source code document (or "page source code") that defines a web page to be generated when read/interpreted by a browser. In this example, authoring tool 21 presents a code view interface 101 and a design view interface 102, such as those interfaces described above with FIG. 1A.

Figure 3A:
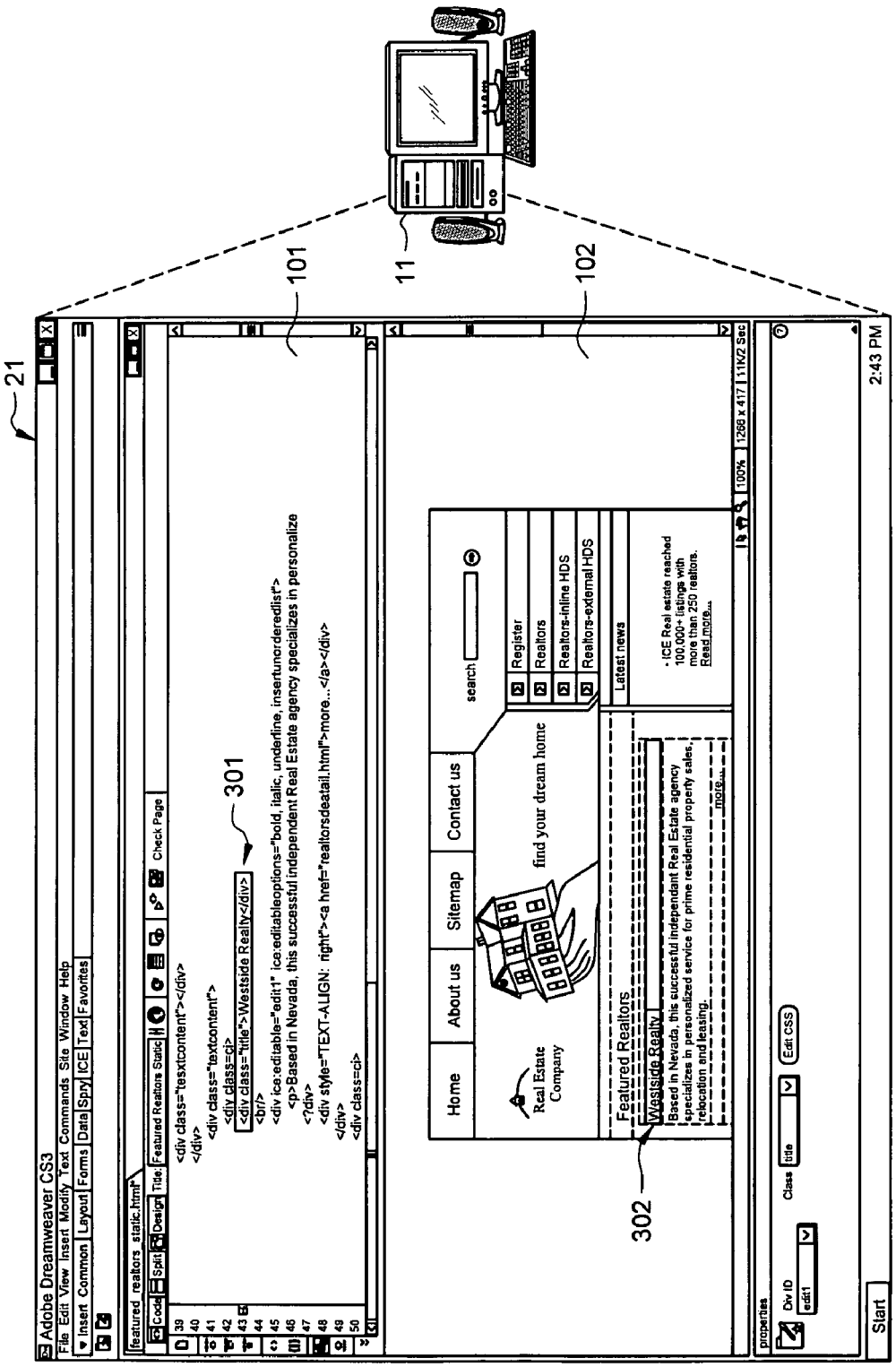
FIGS. 3A-3H show an exemplary scenario of using an authoring tool according to an embodiment of the present invention for defining run-time edit capability of a web page.

In the example of FIG. 3A, a designer may interact with code view 101 or design view 102 to select a region of the web page for which the designer desires to define permitted run-time edit capability. That is, the designer may select a region of the web page which the designer desires to make editable by an authorized user via interaction with the browser's run-time output presentation of the web page. In the illustrated example of FIG. 3A, the designer has selected a region 302 of the web page (as shown in the design view 102), which corresponds to the textual code 301 that defines such selected region. The designer may either select the textual code 301 in code view 101 or the graphical output presentation of such region 302 in design view 102, and in response to selection of the region in either view the corresponding selection in the other view may likewise be highlighted to indicate the selection (as shown in FIG. 3A). The designer may interact with the user interface(s) of authoring tool 21 to perform such selection of the region by employing known techniques, such as by clicking a mouse and dragging the mouse to highlight a desired region to be selected. In this example, the region of the page that the designer selects for defining run-time edit capability thereof corresponds to a "div" element that contains header text (i.e., "Westside Realty" in this example). Of course, any other region of a web page may be likewise selected.

Authoring tool 21 enables the designer to define run-time edit capabilities that are permitted to be performed on the selected region by an authorized user via a browser interface. For instance, in FIG. 3B, authoring tool 21 provides a button 303 that enables the designer to define such edit capabilities that are permitted for the selected region. In certain embodiments, the run-time content editing feature is referred to as "ICE" (integrated content editing), and by clicking on button 303 the designer may make the selected region of the page an "ICE Editable Region". In this exemplary embodiment, such an ICE Editable Region refers generally to a region of the page that is editable by an authorized user (e.g., via operational block 204 of FIG. 2) by interacting with a run-time output presentation 103 of the web page presented via a browser 18 (as shown in FIG. 2).

Figure 3B:
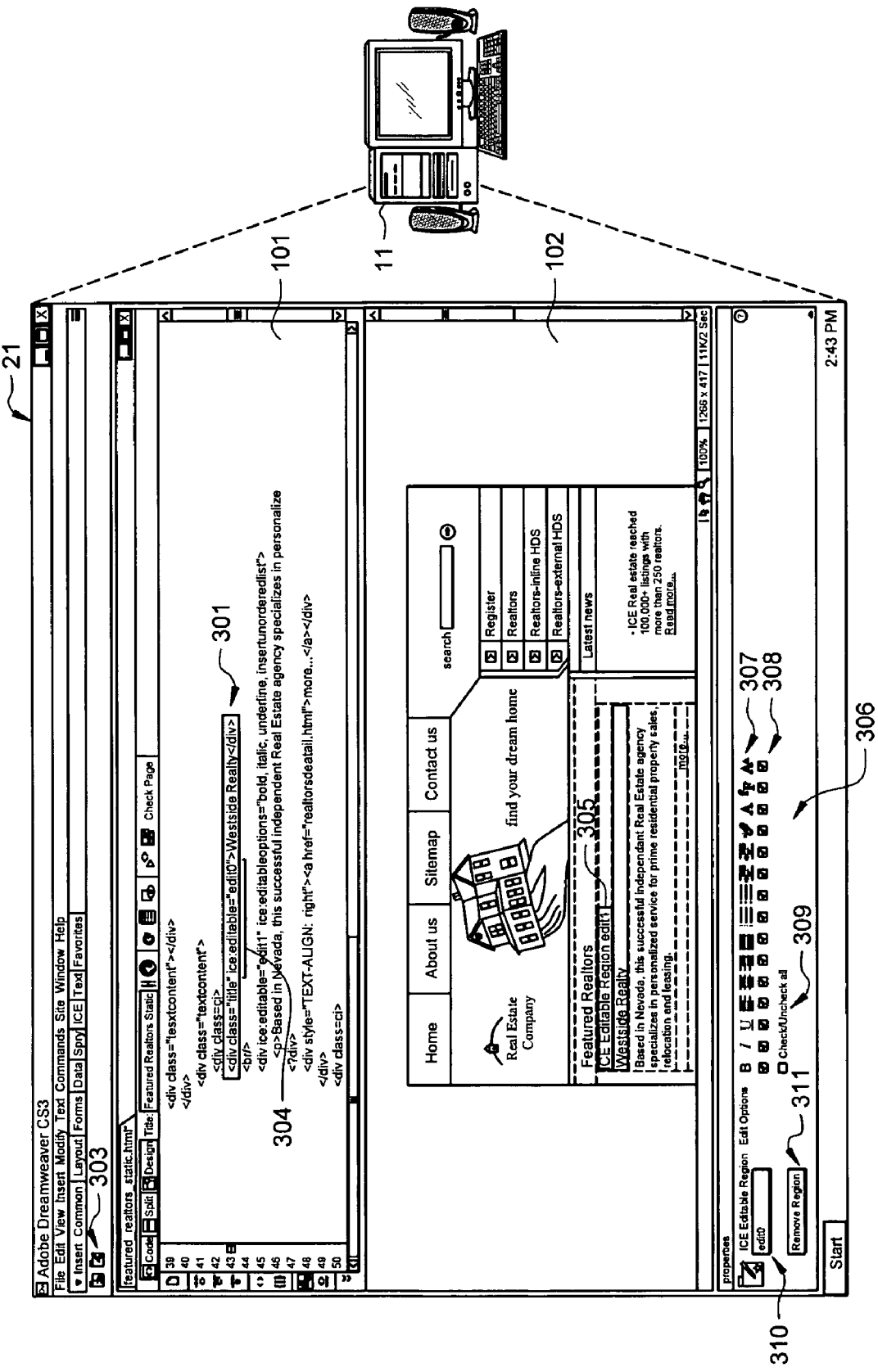

In the example of FIG. 3B, responsive to the designer clicking the button 303, the textual code 301 defining the selected region is modified by the authoring tool 21 to include an "ice:editable" attribute 304, which designates the region as an ICE Editable Region. In this example, a unique identifier (that uniquely identifies the selected region from other regions of the page) is assigned to the selected region. That is, in this example, the attribute 304 includes identifier "edit0" that is assigned to the selected ICE Editable Region.

Further, in this exemplary embodiment, authoring tool 21 recognizes the ice:editable attribute 304 for the region in code view 101, and in response, updates the design view 102 to include an indication that the region is ICE Editable. For instance, in the illustrated example, authoring tool 21 updates design view 102 to show a "tabbed outline" 305 around the portion of the output presentation corresponding to the ICE Editable Region. As shown, the tab 305 may identify the region as an ICE Editable Region, and may also include identification of the region's identifier, "edit0". This may aid the designer in recognizing that he has designated the region as an ICE Editable Region.

Further, a property inspector (PI) interface 306 may be presented for the newly created ICE Editable Region. The PI interface 306 allows the designer to control the level of run-time edit capability for the region. That is, the designer can define, via PI interface 306, which of a plurality of edit functions (or options) are permitted to be performed by an authorized user (e.g., customer) for the ICE Editable Region "edit0." Various edit options 307, such as bolding, italicizing, underlining, left justify, right justify, etc., may be available, and the designer can select one or more of such edit options to be permitted during run-time editing by selecting the corresponding check box(es) 308. The designer may select or unselect all of the edit options 307 by interacting with check box 309.

Text box 310 includes identification of the ICE Editable Region to which the PI interface 306 pertains. In other words, text box 310 identifies the region for which the editing level is being defined via PI interface 306. As described further herein, different ICE Editable Regions may be defined in a given page, and different run-time edit capabilities may be defined for each of the regions. Therefore, text box 310 aids the designer in understanding for which ICE Editable Region the edit capabilities are currently being defined via PI interface 306. In certain embodiments, the designer may change the identifier "edit0" for the region by interacting with text box 310, which updates the corresponding identifier in the ice:editable attribute 304 contained in the textual code view 101.

In addition, in this exemplary embodiment, a "Remove Region" button 311 is also provided that enables the designer to remove the designation of the region as being ICE Editable. That is, the designer may click Remove Region button 311 to cause the corresponding region to not be run-time editable, which would result in the removal of the "ice:editable" attribute 304 from the textual code 301 by authoring tool 21 and also the removal of the tabbed outline 305 from the design view 102 by authoring tool 21.

A corresponding PI interface 306 may be presented by authoring tool 21 any time that an ICE Editable Region is selected by the designer. One way of selecting an ICE Editable Region of a page being authored is by clicking on the tab portion 305 of the tabbed outline of the region in the design view 102.

According to this exemplary embodiment, when a designer selects ones of the permitted run-time edit options 307 that are to be permitted for the ICE Editable Region, an additional attribute may be added to the editable region element to reflect the permitted edit options. For example, in FIG. 3C the designer un-checks all of the check boxes 308 for the edit options 307, wherein an "ice:editableoptions" attribute 312 is inserted into the code 301 for the selected region, which designates "none" for the run-time editable options that are permitted for this region. So, with the "none" designation, the run-time authorized user would still be permitted to perform simple text editing, such as insertion and/or deletion of text to the page (because the region is still defined as being an ICE Editable Region), but the user would not have any of the formatting options 307 available. Of course, if the designer elects to make some of the edit formatting options 307 available to the run-time editing user, the ice:editableoptions attribute 312 would be updated to identify the permitted edit formatting options 307 (instead of "none").

Figure 3C:
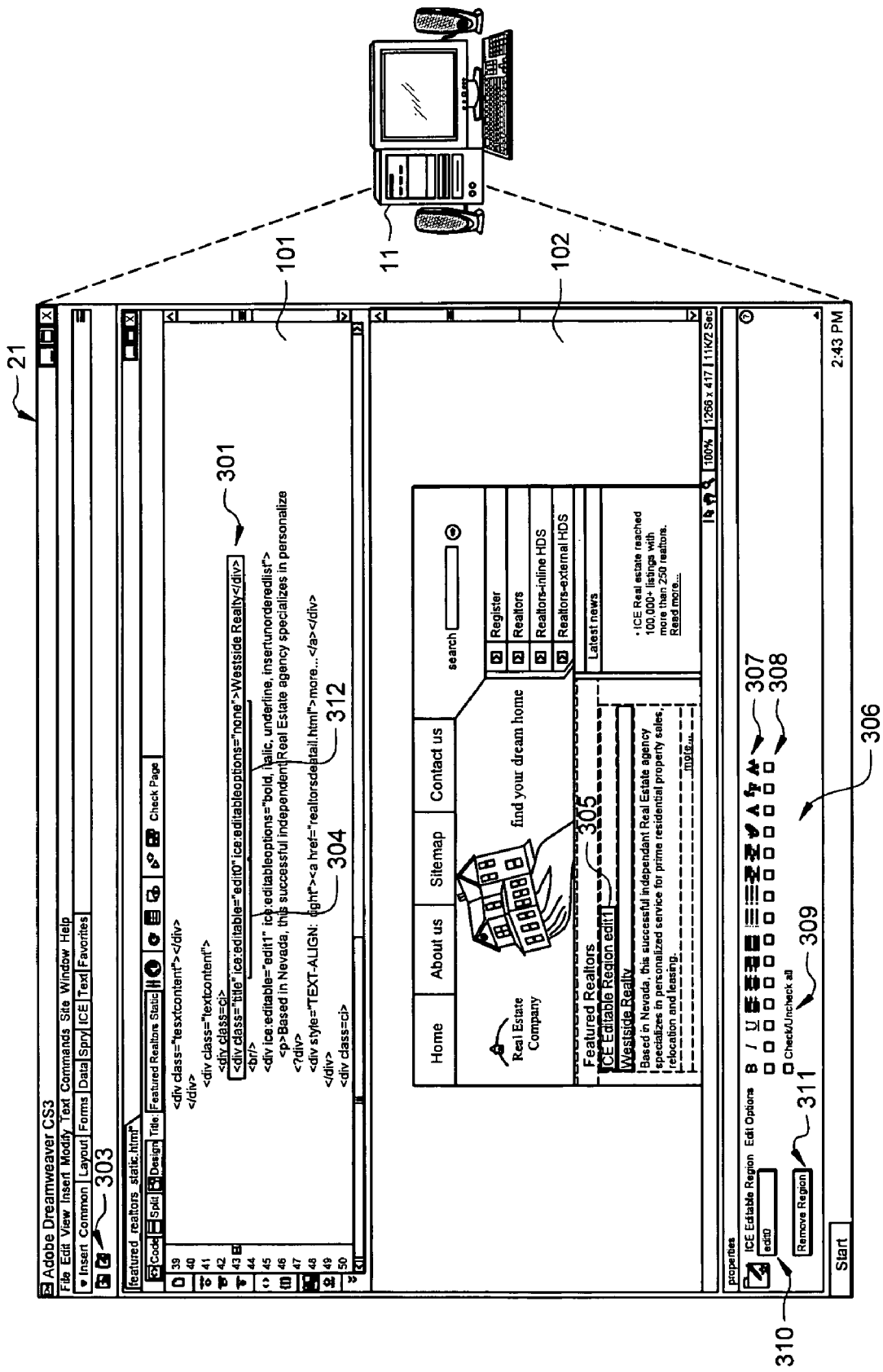
Figure 3D:
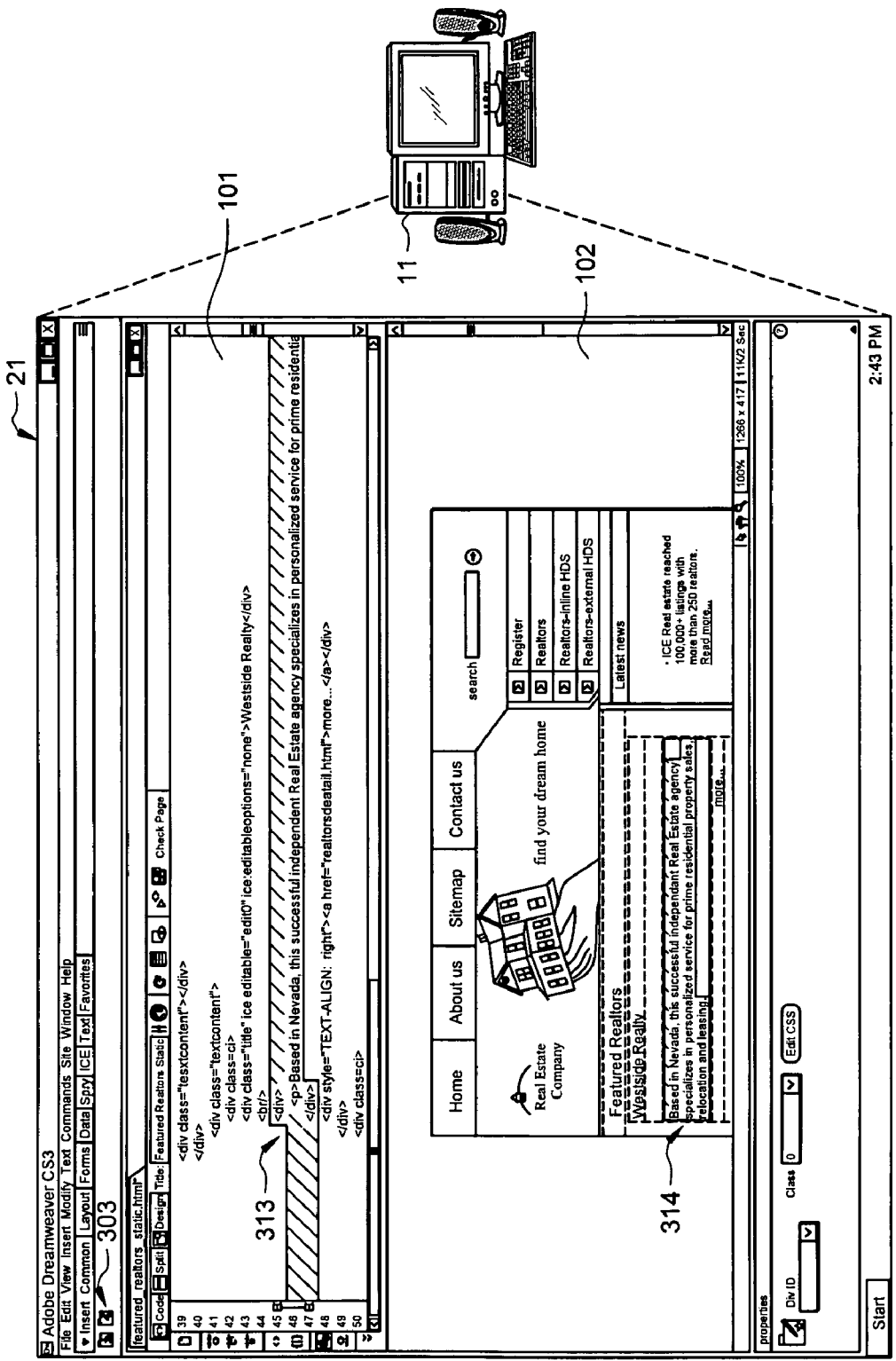
Figure 3E:
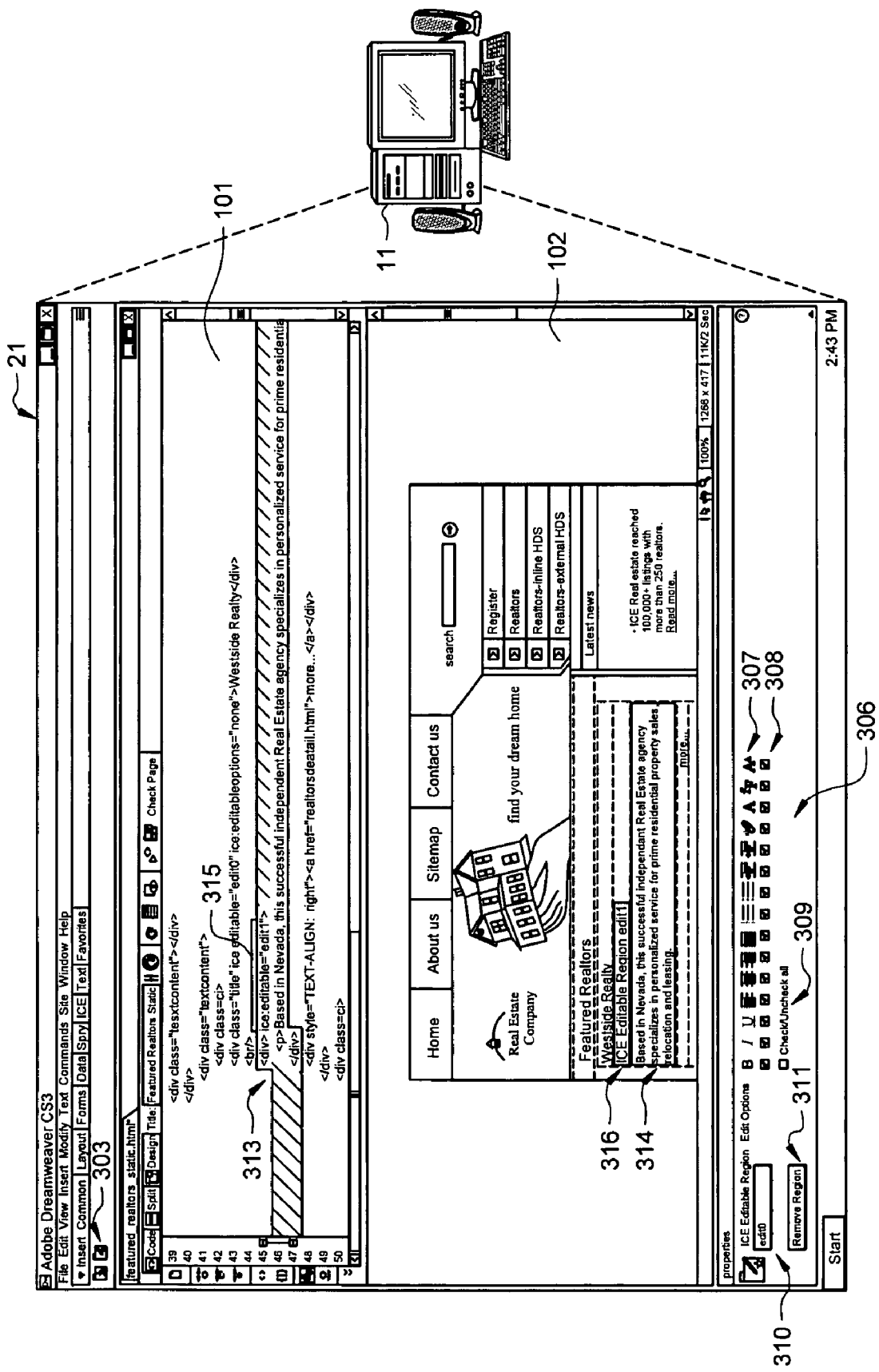
Figure 3F:
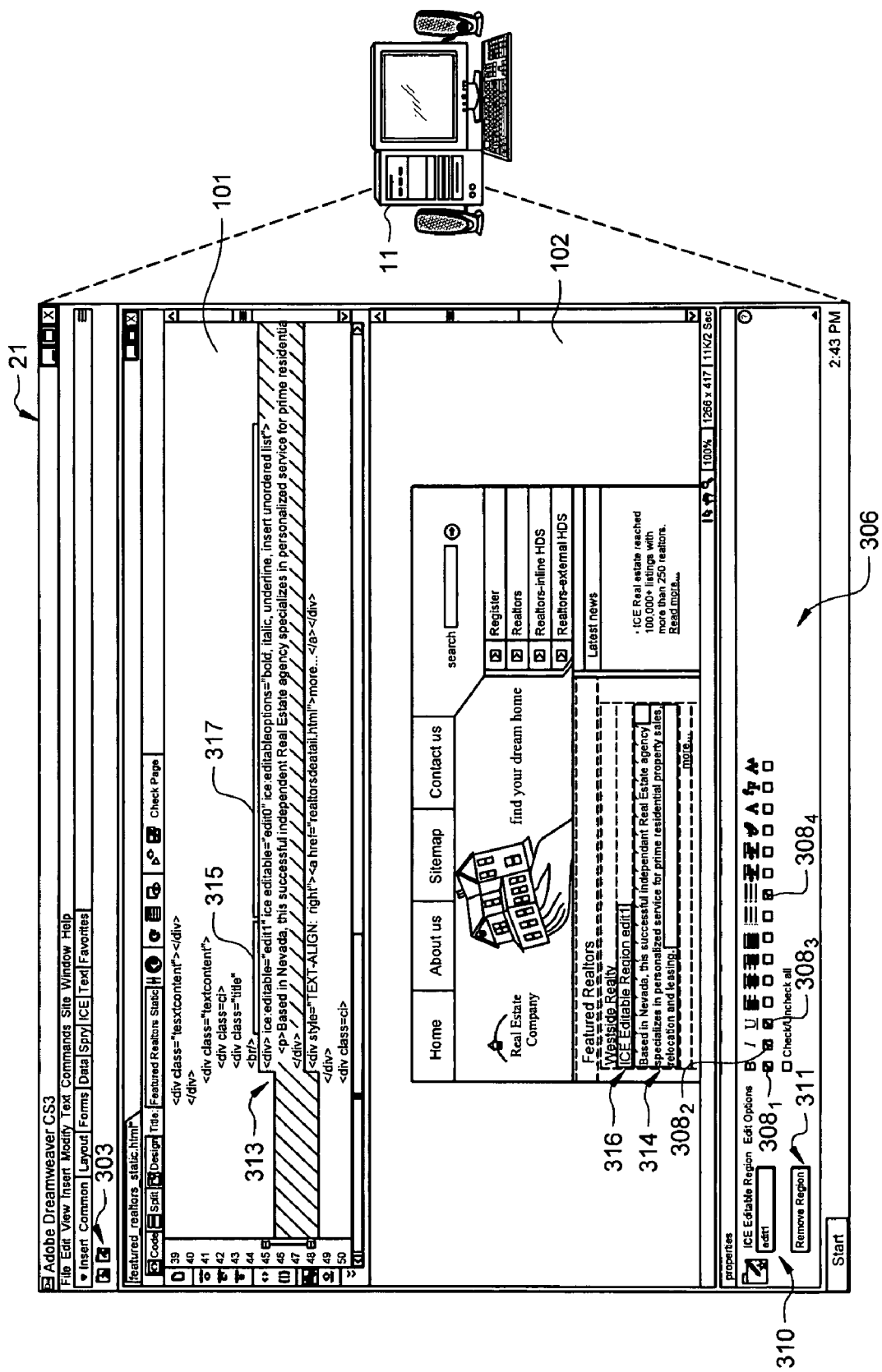

Continuing with this exemplary scenario, in FIG. 3D, the designer selects a second region of the web page for which the designer desires to define permitted run-time edit capability. In the illustrated example of FIG. 3D, the designer has selected a region 314 of the web page (as shown in the design view 102), which corresponds to the textual code 313 that defines such selected region. Again, the designer may either select the textual code 313 in code view 101 or the graphical output presentation of such region 314 in design view 102, and in response to selection of the region in either view, the corresponding selection in the other view may likewise be highlighted to indicate the selection (as shown in FIG. 3D). In this example, the region of the page that the designer selects for defining run-time edit capability thereof corresponds to another "div" element that contains description text. Of course, any other region of a web page may be likewise selected.

Authoring tool 21 enables the designer to define run-time edit capabilities that are permitted to be performed on this second selected region 314 by an authorized user via a browser interface. For instance, in FIG. 3E the designer may click on button 303 to make the second selected region 314 of the page an "ICE Editable Region". Responsive to the designer clicking the button 303, the textual code 313 defining the selected region is modified by the authoring tool 21 to include an "ice:editable" attribute 315, which designates the region as an ICE Editable Region. In this example, a unique identifier (that uniquely identifies the selected region from other regions of the page, such as the edit0 region discussed above) is assigned to the selected region. In this example, the attribute 315 includes identifier "edit1" that is assigned to the selected ICE Editable Region.

Further, in this exemplary embodiment, authoring tool 21 recognizes the ice:editable attribute 315 for the region in code view 101, and in response, updates the design view 102 to include an indication that the region is ICE Editable. For instance, in the illustrated example, authoring tool 21 updates design view 102 to show a "tabbed outline" 316 around the portion of the output presentation corresponding to the ICE Editable Region. As shown, the tab 316 may identify the region as an ICE Editable Region, and may also include identification of the region's identifier, "edit1". This may aid the designer in recognizing that he has designated the region as an ICE Editable Region.

Further, a property inspector (PI) interface 306 may be presented for the newly created ICE Editable Region, edit1. As discussed above, the PI interface 306 allows the designer to control the level of run-time edit capability for the region. That is, the designer can define, via PI interface 306, which of a plurality of edit functions (or options) are permitted to be performed by an authorized user (e.g., customer) for the ICE Editable Region "edit1." According to this exemplary embodiment, when a designer selects ones of the permitted run-time edit options 307 that are to be permitted for the ICE Editable Region, an additional attribute may be added to the editable region element to reflect the permitted edit options. For example, in FIG. 3F the designer selects the check boxes $308_1$, $308_2$, $308_3$, and $308_4$, which correspond respectively to the edit capabilities of bold, italicize, underline, and insertion of an unordered list. Thus, the designer selects to provide certain ones of the edit options 307 to make available for use by an authorized user in performing run-time editing of this region, edit1, of the page. It should be recognized that different edit capabilities can be defined for different ICE Editable Regions. For instance, in the above example no edit formatting capabilities 307 are made available to the run-time user for the "edit0" region, while certain ones of the edit formatting capabilities 307 are selected as available to the run-time user for the "edit1" region of the page. In response to the selection of the boxes $308_1$-$308_4$, an "ice:editableoptions" attribute 317 is inserted into the code 313 for the selected region, which designates "bold, italic, underline, insertunorderedlist" for the run-time editable options that are permitted for this region, as specified in PI interface 306. Accordingly, the run-time authorized user is permitted to not only perform simple text editing, such as insertion and/or deletion of text to the page, but the user is also permitted to perform the selected ones of the formatting options 307 for this region "edit1" of the page.

According to certain embodiments of the present invention, a designer may designate one or more regions of a page as being editable "section(s)", which enables an authorized user to perform such tasks as insert, delete, and/or rearrange/reorder the sections. For instance, in one embodiment, a user may select a portion of the page as being a container that includes one or more sections therein. Each section may define a corresponding layout, such as a header, description, etc. The designer may further define a level of editing capability that is permitted during run-time for the sections, such as adding a new section, removing an existing section, reordering the sections, etc. within the defined container. If, during run-time editing, an authorized user performs an operation requesting to have a new section added within a container, for example, a new section having consistent formatting and edit capabilities/restrictions as similar sections in the container may be so added.

Figure 3G:
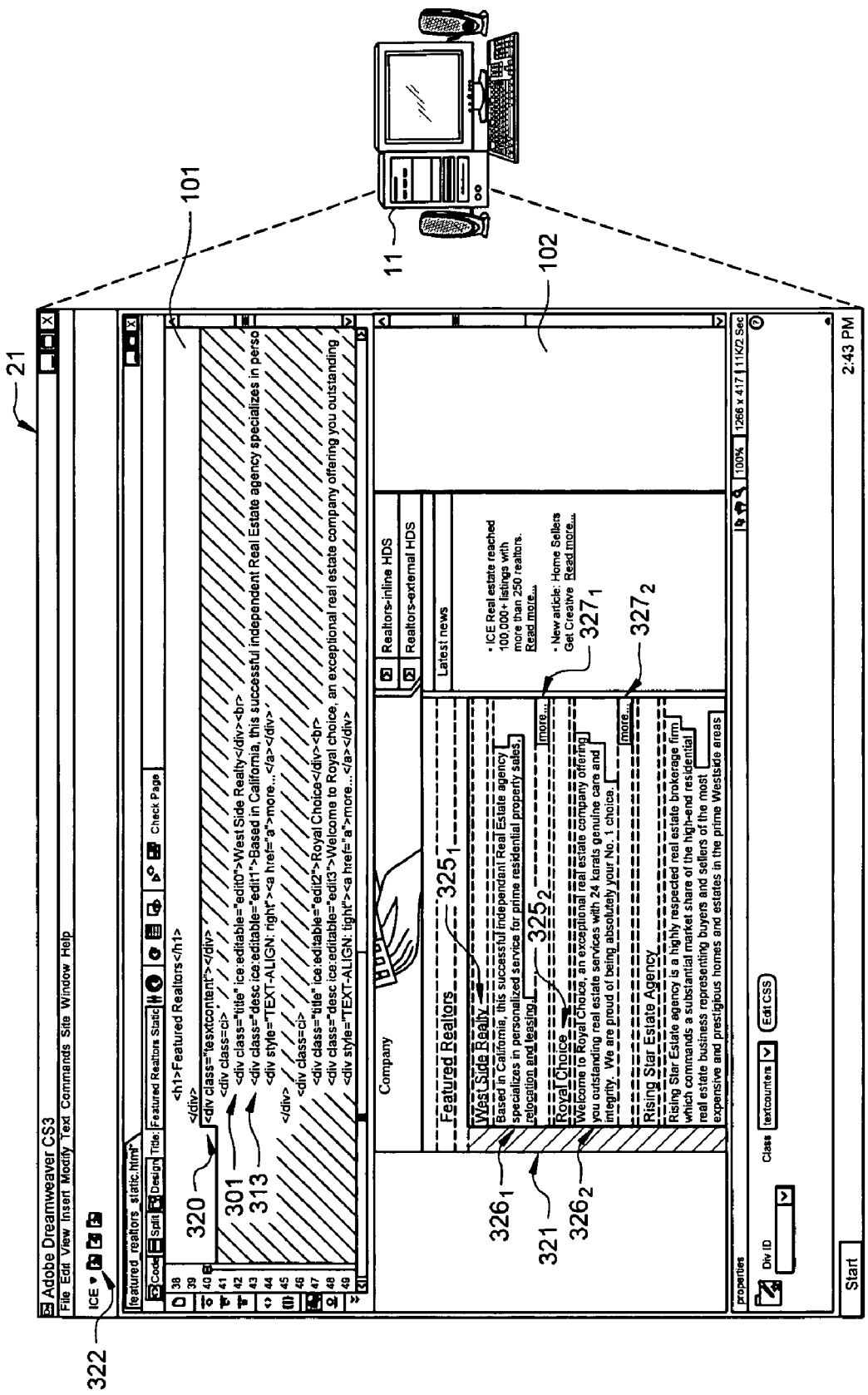

Continuing further with the above exemplary scenario of FIGS. 3A-3F, FIGS. 3G-3H show an example in which a designer designates a run-time editing ability to define a container that contains run-time editable sections therein. In FIG. 3G, the designer selects a portion 321 of the page that encompasses a plurality of editable regions. In the illustrated example of FIG. 3G, the designer has selected a portion 321 of the web page (as shown in the design view 102), which corresponds to the textual code 320 that defines such selected region. In this example, the selected portion 321 includes a plurality of editable regions therein. For instance, selected portion 320 includes editable regions 301 and 313 discussed above. In the illustrated example, the selection 320 encompasses the agency "sections" of the real estate company page, wherein each section is a "div" element that contains a heading, a description, and a "more" link. Thus, each "section" of the selected portion 320 defines a corresponding layout, which in this example includes a corresponding heading, description, and "more" link. For instance, as shown in design view 102, a first section of the selected portion 321 includes a header $325_1$ of "West Side Realty", a description $326_1$, and a "more" link $327_1$. Similarly, a second section of the selected portion 321 includes a header $325_2$ of "Royal Choice", a description $326_2$, and a "more" link $327_2$.

Figure 3H:
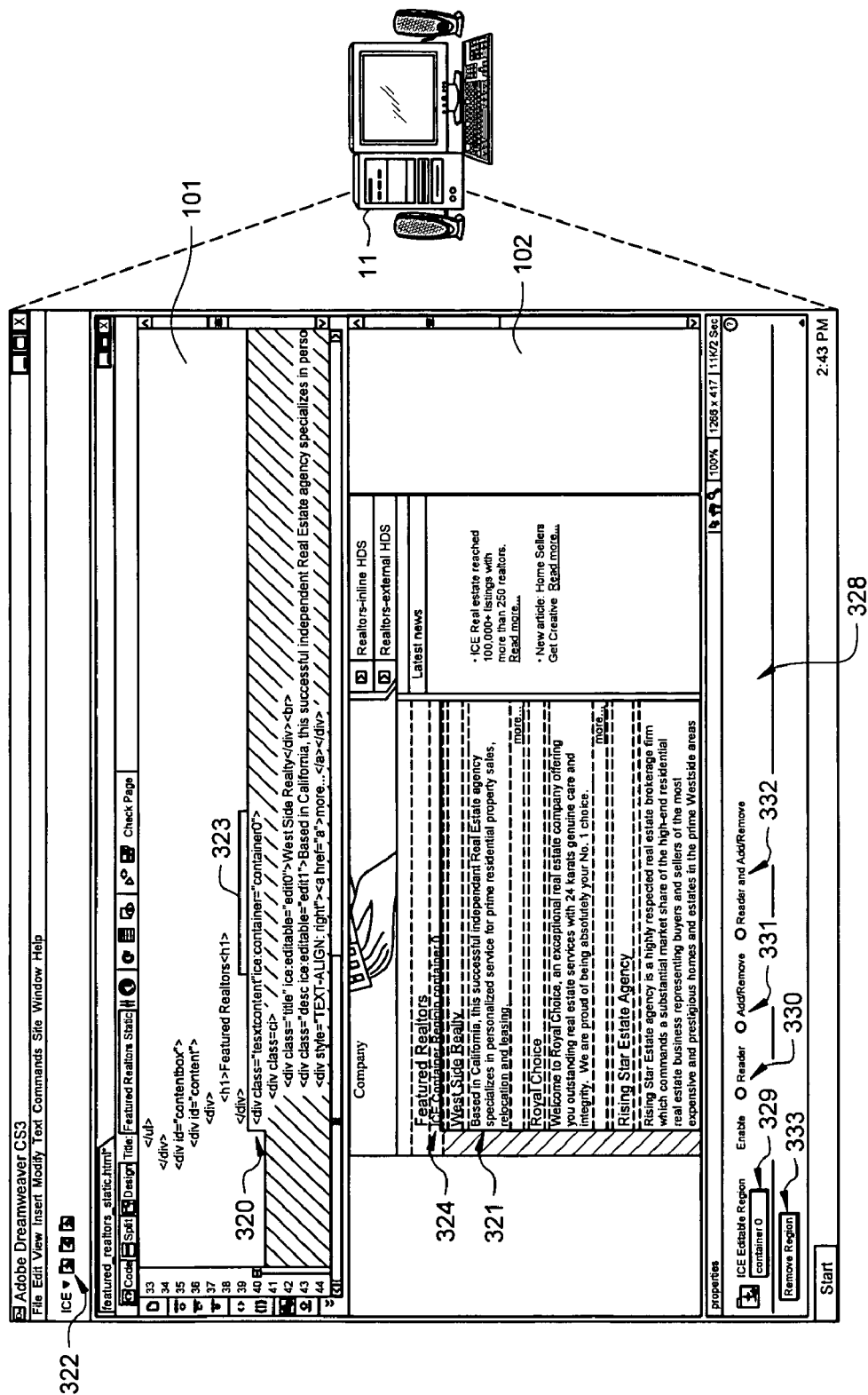

To enable section editing in ICE, the designer designates the element containing the sections (e.g., the opening "div" of selection 320) as an ICE:Container. As shown in FIG. 3H, the designer may so designate an element as an ICE:Container in this exemplary embodiment by clicking button 322 on the user interface. Responsive to the designer clicking the button 322, the textual code 320 defining the selected element is modified by the authoring tool 21 to include an "ice:container" attribute 323, which designates the selected element 320 as an ICE:Container region that contains editable sections therein and assigns an identifier "container0" to such container region. Further, in this exemplary embodiment, authoring tool 21 recognizes the ice:container attribute 323 for the selected element 320 in code view 101, and in response, updates the design view 102 to include an indication that the selected region is an ICE Container region containing editable sections. For instance, in the illustrated example, authoring tool 21 updates design view 102 to show a "tabbed outline" 324 around the portion of the output presentation corresponding to the ICE Container Region 321. As shown, the tab 324 may identify the region 321 as an ICE Container, and may also include identification of the container's identifier, "container0". This may aid the designer in recognizing that he has designated this region of the page as an ICE Container Region that includes editable sections.

Further, a property inspector (PI) interface 328 may be presented for the newly created ICE Container Region, container0. The PI interface 328 allows the designer to control the level of run-time edit capability for the sections in the container region. That is, the designer can define, via PI interface 328, which of a plurality of edit functions (or options) 330, 331, and 332 are permitted to be performed by an authorized user (e.g., customer) for the sections of the ICE Container Region "container0." In this example, such edit capability for the sections as reorder 330, add/remove 331, and reorder and add/remove 332 are available. Thus, the designer can limit the section editing capability for the container region, container0, to reorder only 330 (wherein an authorized user can only reorder the sections), to add/remove only 331 (wherein an authorized user can only add and remove sections from the container during run-time), or the designer can choose to permit an authorized user to perform both reorder and add/remove edit operations 332. According to this exemplary embodiment, when a designer selects ones of the run-time section editing options 330-332 that are to be permitted for the ICE Container Region, an additional attribute may be added to the container region 320 (not shown) to reflect the permitted edit options. For instance, if only reorder 330 editing capability is permitted, an attribute "ice:section_edit_options=reorder" may be inserted after the attribute 323 in code 320. It should be recognized that different section editing capabilities can be defined for different ICE Container Regions that may be defined by the designer.

Text box 329 includes identification of the ICE Container Region to which the PI interface 328 pertains. In other words, text box 329 identifies the container region for which the editing level for sections is being defined via PI interface 328. As described further herein, different ICE Container Regions may be defined in a given page, and different run-time section editing capabilities may be defined for each of the container regions. Therefore, text box 329 aids the designer in understanding for which ICE Container Region the section editing capabilities are currently being defined via PI interface 328. In certain embodiments, the designer may change the identifier "container0" for the container region by interacting with text box 329, which updates the corresponding identifier in the ice:container attribute 323 contained in the textual code view 101.

In addition, in this exemplary embodiment, a "Remove Region" button 333 is also provided that enables the designer to remove the designation of the region as being an ICE Container Region. That is, the designer may click Remove Region button 333 to cause the corresponding region 321 to not be a container region having run-time editable sections therein, which would result in the removal of the "ice:container" attribute 323 from the textual code 320 by authoring tool 21 and also the removal of the tabbed outline 324 from the design view 102 by authoring tool 21.

A corresponding PI interface 328 may be presented by authoring tool 21 any time that an ICE Container Region is selected by the designer. One way of selecting an ICE Container Region of a page being authored is by clicking on the tab portion 324 of the tabbed outline of the container region in the design view 102.

It should be recognized that while in the exemplary embodiments described above, authoring tool 21 aided a designer by inserting certain code into the page's source code for enabling run-time editing capabilities, such as by inserting the ice:editable and ice:editableoptions attributes and/or the above-mentioned code 401 that references a run-time edit engine 22, in other embodiments a designer may alternatively manually input such textual code.

According to certain embodiments, the run-time editing operations are supported by a run-time edit engine 22 of FIG. 2, which may be referred to herein as an ICE engine. For instance, ICE engine 22 is operable to interpret the code (e.g., attributes) included in the page's source code that defines the run-time edit capabilities permitted for regions of the page's output presentation. For instance, in response to a user requesting to perform run-time editing of an output presentation of a page that is being presented on browser 18, ICE engine 22 may (once determined that the requesting user is authorized) enable editing via the browser 18 of the content of the output presentation in accordance with the run-time editing capability defined in the page's source code. For instance, in certain embodiments, the ICE engine 22 presents, via the browser 18, a content editing environment for enabling run-time editing of the content in accordance with the run-time editing capability defined in the page's source code, as discussed further herein. Further details regarding an exemplary run-time editing engine 22 that might be employed according to embodiments of the present invention are provided in concurrently filed and commonly assigned U.S. patent application Ser. No. 11/951,165 titled "SYSTEMS AND METHODS FOR RUN-TIME EDITING OF A WEB PAGE," the disclosure of which is incorporated herein by reference.

Figure 4:
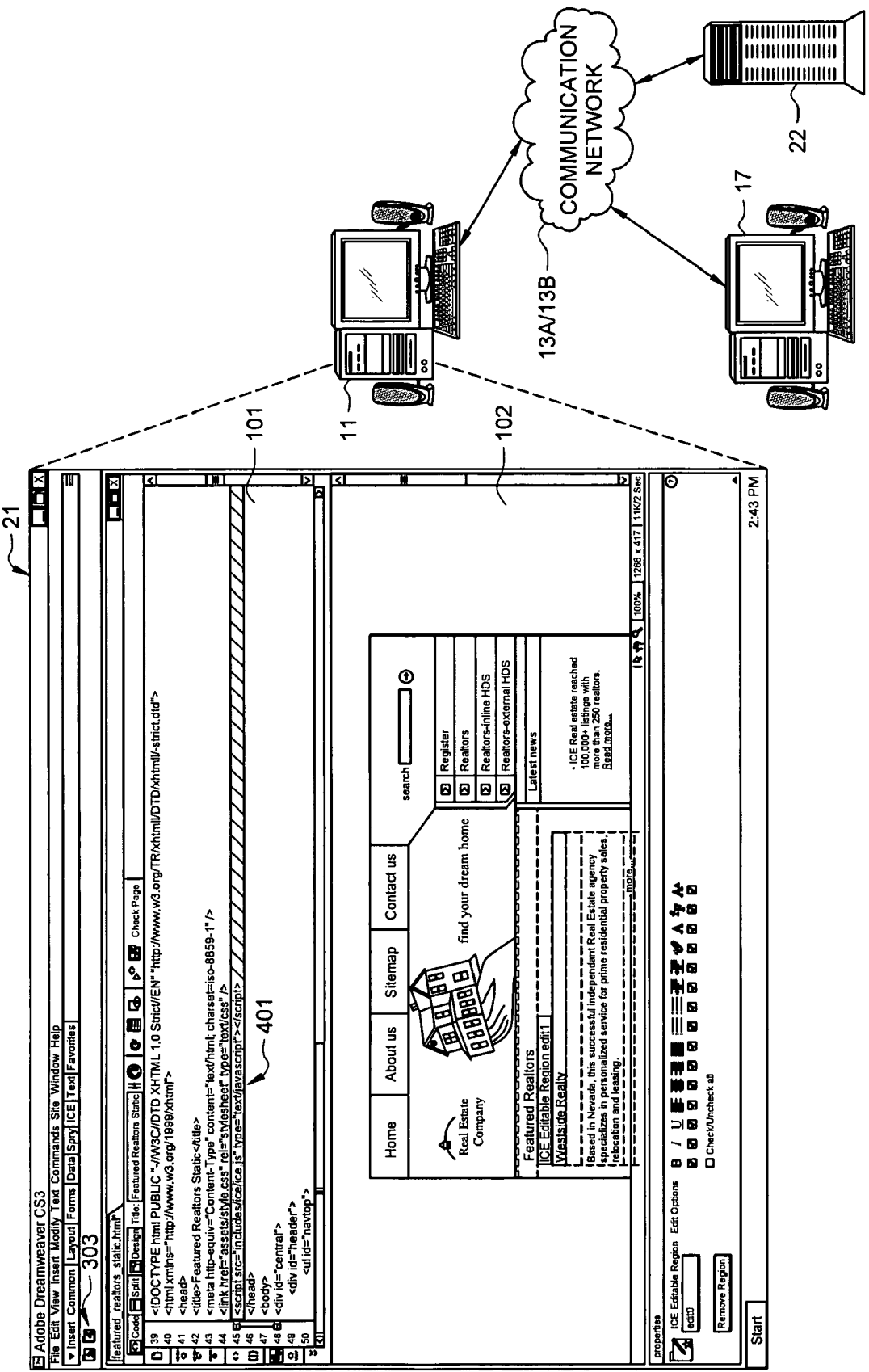
FIG. 4 shows an example of an authoring tool according to one embodiment of the present invention for referencing, in a page's source code, a run-time editing engine.

As an example, FIG. 4 shows an example of authoring tool 21 according to one embodiment of the present invention. In response to a designer making at least one region of the page being authored an ICE Editable Region (as discussed above with FIGS. 3A-3H), authoring tool 21 inserts code 401 into the page's source code, which references logic on a run-time engine 22 that is operable to interpret the ICE attributes that are included in the page. Of course, in certain embodiments, rather than authoring tool 21 inserting the code for referencing the run-time edit engine, the designer may manually input such code 401. During run-time editing of an ICE-enabled page, logic on a run-time edit engine 22 may be invoked (per the inserted reference in code 401) to enable interpretation of the ICE attributes included in the page's source code in order to enable a run-time user to edit the content of the web page in accordance with the permitted editing capabilities defined for the page by the designer.

In the illustrated example, the logic on run-time engine 22 is implemented using the well-known PHP script language. Of course, such logic for interpreting the ICE attributes of a page for enabling run-time editing capabilities as described further herein may be implemented using any back-end technology, such as Microsoft's Active Server Page (ASP) technology, Cold Fusion, etc. In this example, the relevant PHP file that code 401 references is implemented on the ICE engine 22.

According to one embodiment, ICE engine 22 has 2 components: a) The ICE Client, and b) The ICE Web Services. According to one embodiment, a small .js (Javascript) code resides on the host server 14. The .js code recognizes the hotkey press by a user (or other input) that requests run-time editing of the page, and the .js code dynamically loads the ICE Client in the user's web browser 18. According to one embodiment, the ICE Client is a set of Javascript/HTML/CSS files along with a flash component (basically an Ajax application that still runs on the user's browser 18). The Javascript/HTML/CSS is used for all the user interface and logic in the browser 18, while the flash component is used as a proxy for all service/data calls to the ICE Web Service (that may reside on some other server, such as on http://ice.adobe.com).

According to this exemplary embodiment, the ICE Web Services provide the actual logic needed for such tasks as login, logout, save modified page, upload images, do spellchecking, etc. These services may be provided by a designated server of a company that makes the run-time editing available, such as on a server of Adobe Systems Incorporated.

Thus, according to one embodiment, the ICE Client is loaded dynamically in the user's browser 18 (from web server 14) and handles all editing user interface (e.g., login dialog, toolbar/menu bar, editing regions user interface, file manager, etc.) and uses the flash component to call the above-mentioned Web Services to perform the actual editing operations. That is, the ICE Client is loaded into the browser 18 to provide the run-time editing user interface, and which interacts (via the flash component of the ICE Client) with the Web Services on the ICE engine 22 to perform the editing tasks.

Turning now to FIGS. 5A-5I, an exemplary scenario of an authorized user performing run-time editing of content of an ICE-enabled page according to an embodiment of the present invention is shown. FIGS. 5A-5I show an exemplary browser 18, which comprises computer-executable software code stored to a computer-readable medium that is readable by a processor of a client computer 17 and, when executed by such processor, causes computer 17 to perform the various operations described further herein for such browser 18. According to certain embodiments of the present invention, browser 18 may be any standard browser for accessing and presenting output of web pages, such as Microsoft's Internet Explorer (IE) for example.

As explained above with FIG. 1B, browser 18 is operable to interpret source code 16 of a web page that is accessed via hosting web server 14 and generate a corresponding output presentation 103 for the page. According to embodiments of the present invention, when the page being accessed by browser 18 is an ICE-enabled page, such as discussed above with FIGS. 3A-3H and 4, an authorized run-time user can interact with the output presentation 103 of browser 18 to perform run-time editing of the content of the page. That is, an authorized run-time user can perform the editing operations that are defined in the page's source code as permissible for one or more ICE Editable Regions of the page.

Figure 5A:
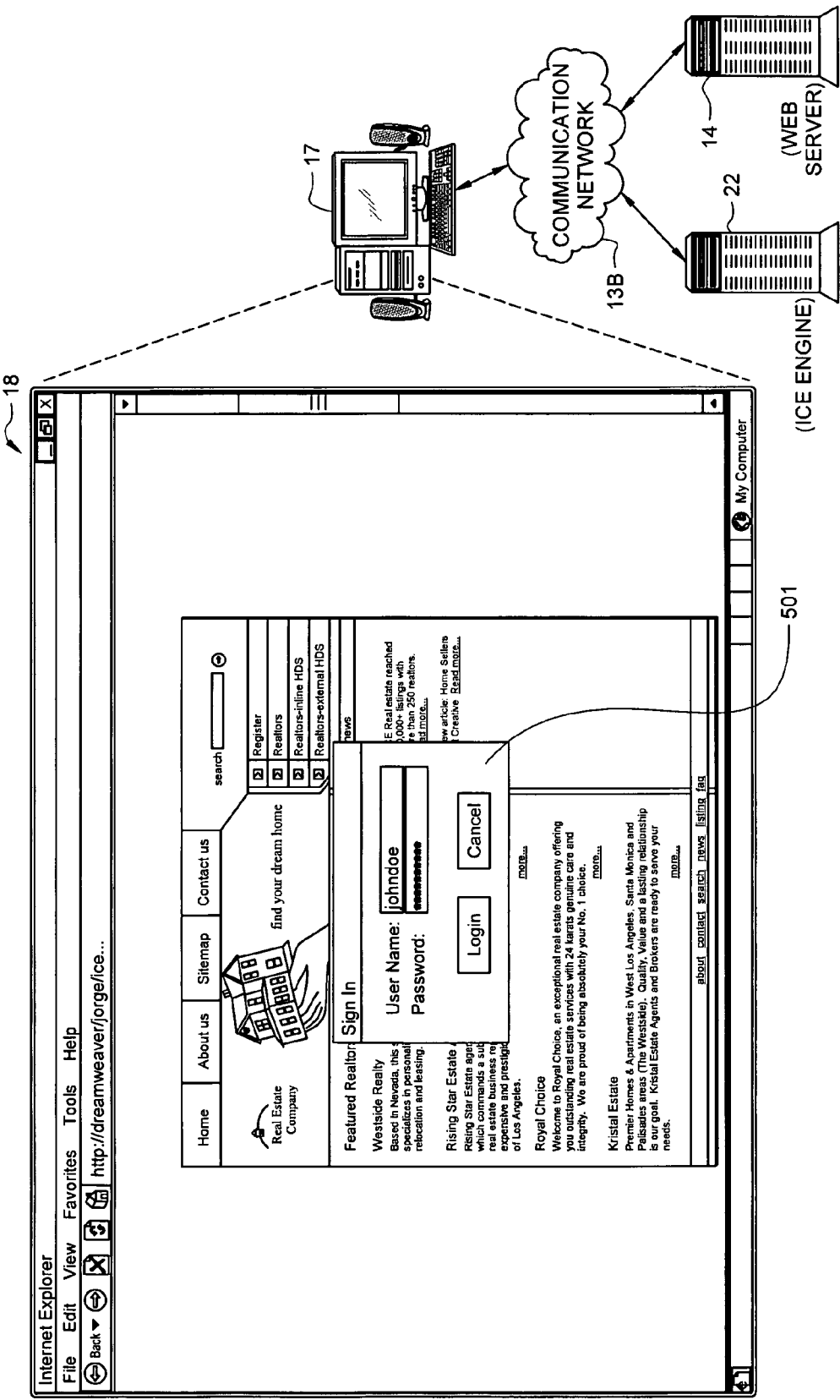
FIGS. 5A-5I show an exemplary scenario of an authorized user performing run-time editing of content of a run-time editable page according to an embodiment of the present invention.

As shown in the example of FIG. 5A, when accessing the run-time ICE-enabled page via browser 18, a user may (via client computer 17) input a command to request run-time editing of the page's content. For instance, a predefined key sequence may be input via a keyboard of computer system 17 in order to request such run-time editing. If the page is ICE-enabled (e.g., if the page's source code contains the appropriate reference to the ICE engine, such as the reference to the .js code 401 in the example of FIG. 4), the command (e.g., key sequence) input by the user to browser 18 may be recognized by logic (e.g., the referenced .js code) residing on web server 14. In response to such command, in this exemplary embodiment, ICE Client logic is downloaded to the client's computer 17, and such ICE Client logic presents a sign-in (or "log-in") interface 501 that prompts the user to input certain identifying information, such as a user name and password, which ICE engine 22 may use to confirm that the user is an authorized user for performing the requested run-time editing of the page. For instance, the authorized user(s) and their corresponding authorization information (e.g., user name, password, etc.) may be stored to a database that is accessible by ICE engine 22, which ICE engine 22 may employ to determine whether a requesting user is authorized to perform run-time editing of the content of a given page. It should be recognized that while web server 14 and ICE engine 22 are described here as implemented as separate servers, in certain embodiments they may be implemented on a common server.

Figure 5B:
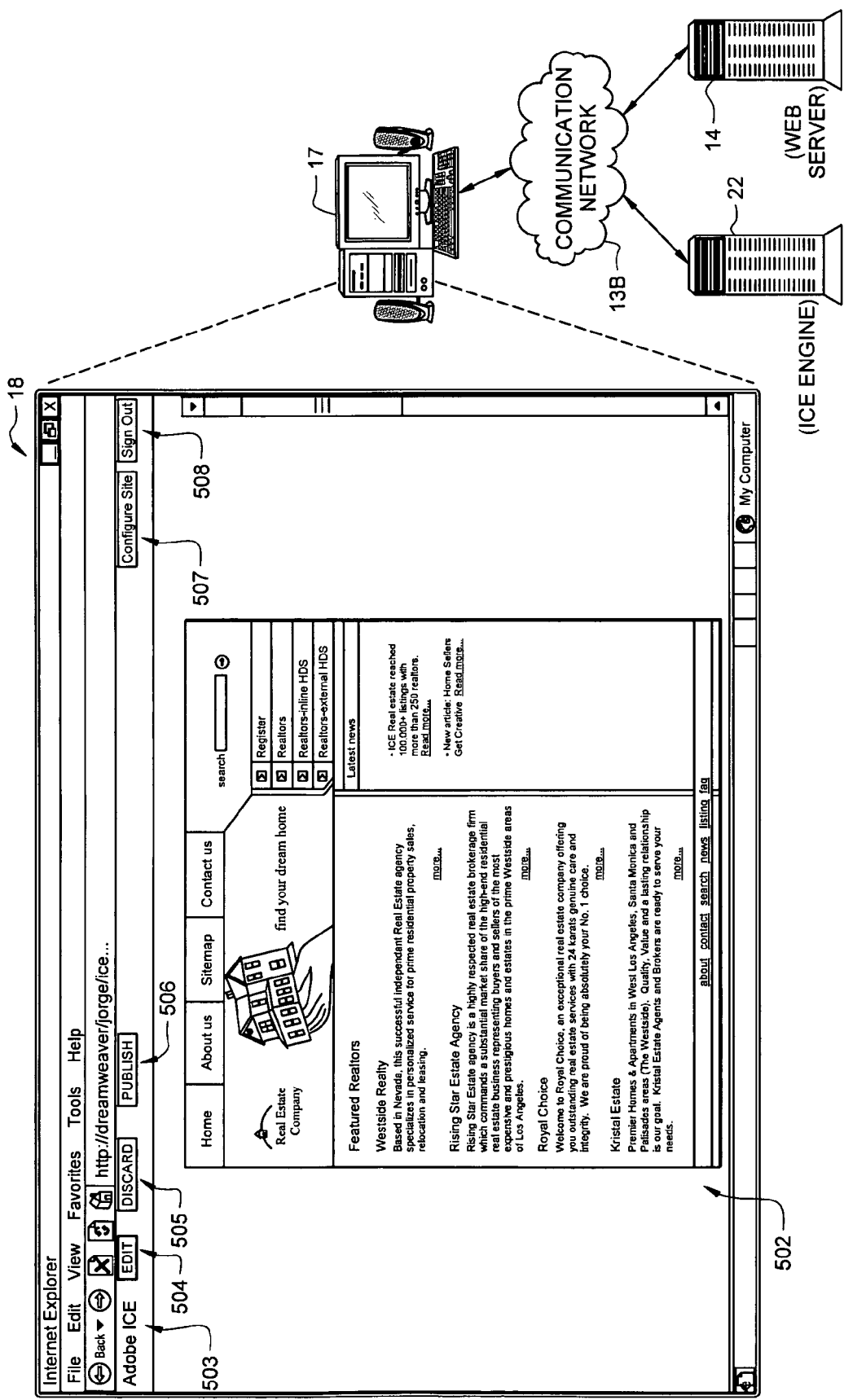

If the requesting user is determined as authorized, then ICE engine 22 returns an indication of successful login, and the ICE Client presents a run-time editing interface 502 for the page on browser 18, as shown in FIG. 5B. For instance, in the example of FIG. 5B, the output presentation 103 of the web page is presented along with an additional toolbar 503 that is provided by the ICE Client. Toolbar 503 provides certain tools with which a user can interact to perform editing operations on the web page. For instance, in the illustrative example of FIG. 5B, toolbar 503 includes an edit button 504, discard button 505, publish button 506, configure site button 507, and sign out button 508. Edit button 504, when activated (e.g., clicked) by a user, presents editing tools to enable the user to perform certain editing operations on the web page in accordance with the authorized editing capabilities that are defined by the designer in the page's source code. That is, activation of edit button 504 places the page into an edit mode in which a more detailed editing interface may be presented to the user. Discard button 505, when activated by a user, discards a previously-saved draft of an edited page, thereby reverting to the previously-published, current run-time version of the page that is being served by hosting web server 14. Publish button 506, when activated by a user, causes the edited page to be published to web server 14, thereby causing such edited page to become the new run-time page being served to clients by hosting web server 14. And, sign out button 508, when activated by a user, logs the user off of the ICE engine 22, thereby ending the run-time editing session.

Figure 5C:
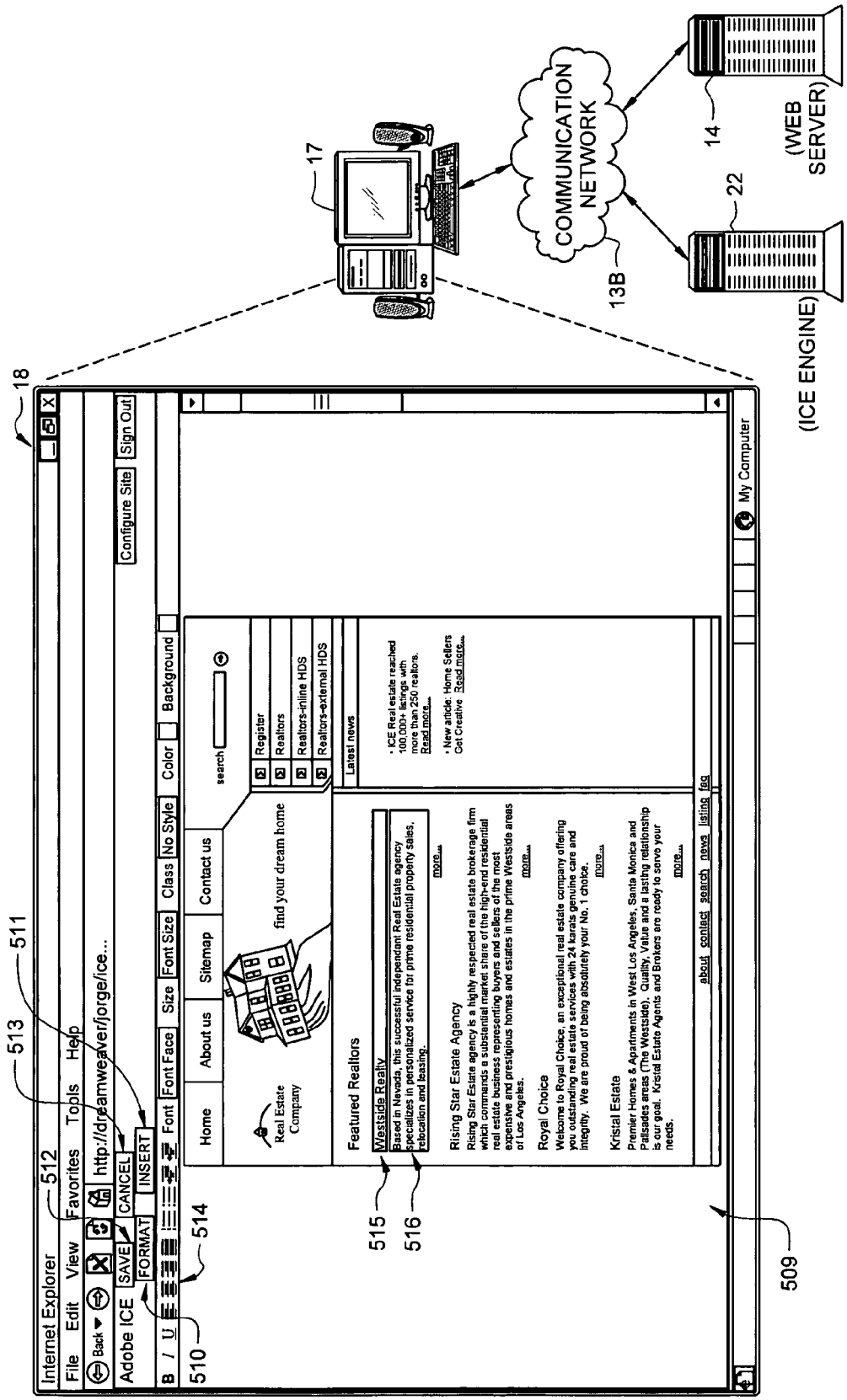
Figure 5D:
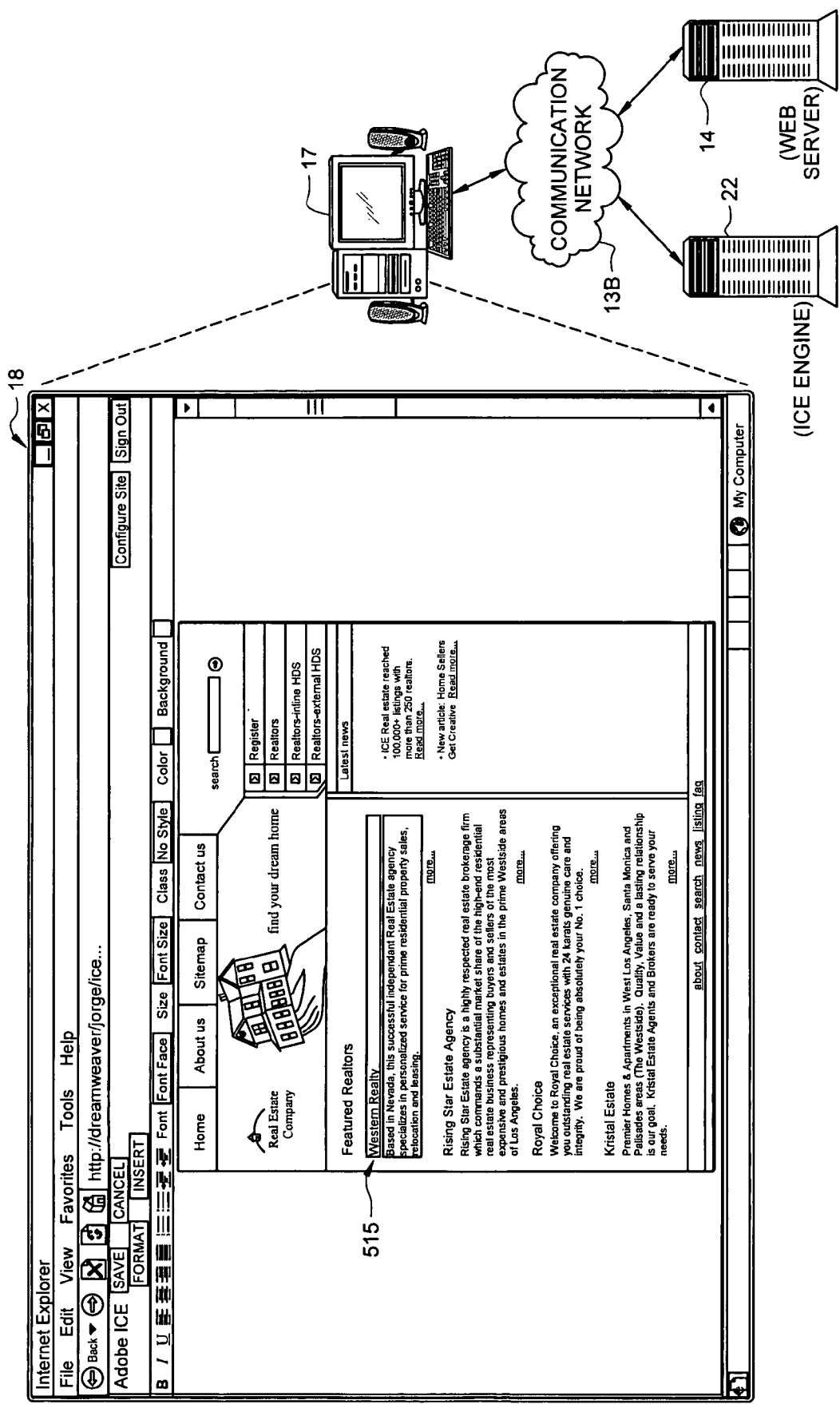

Continuing with this exemplary scenario, responsive to the user activating edit button 504, the page is placed into a run-time edit mode and a more detailed editing interface 509 is presented for the page, an example of which is shown in FIG. 5C. According to one embodiment, this exemplary editing interface 509 identifies editable regions of the page. For instance, the non-editable portions of the page may be shown with relatively dark shading, while the editable regions (as designated as such by the underlying source code of the page), such as editable regions 515 and 516 in the example of FIG. 5C, are shown with relatively lighter shading or no shading at all. This aids the user in recognizing which regions of the page are editable. The user may interact directly with the editable regions (e.g., regions 515 and 516), such as by clicking on a region and editing the text contained in such region.

Additionally, the user may further use any of the formatting tools 514 that are permitted for the region (as defined by the page's underlying source code). According to one embodiment, editing interface 509 identifies various ones of the formatting tools 514 that are permitted for use in a selected region in which the user is editing. For instance, when a user clicks in region 515, ones of the formatting tools 514, if any, that are designated by the page's source code as being permitted for use by the user are displayed enabled, while ones of the formatting tools 514 that are not permitted for editing of region 515 are either not displayed at all or are shown as disabled (e.g., shaded to indicate that they are not available for use). As an example, in FIG. 3C, the designer specifies that the region of the page corresponding to region 515 of FIG. 5C has no permitted edit formatting options; and thus, when the user clicks on region 515 in FIG. 5C, the user is permitted to edit the text in that region but is not provided use of any of the formatting tools 514. As another example, in FIG. 3F, the designer specifies that the region of the page corresponding to region 516 of FIG. 5C has certain permitted edit formatting options (bold, italicize, underline, and insert unordered list); and thus, when the user clicks on region 516 in FIG. 5C, the user is permitted to edit the text in that region and is also provided use of the corresponding ones of formatting tools 514 for performing the permitted formatting options.

The exemplary editing interface 509 shown in FIG. 5C includes a format tab 510 and an insert tab 511. When format tab 510 is selected, various edit formatting tools 514 are presented. Ones of the edit formatting tools 514 that are active (i.e., available for use by the user) for a given ICE Editable Region of the page correspond to the ones of the edit formatting capabilities 308 that were selected by the designer and which are defined in an ice:editableoptions attribute contained in the source code for such region of the page (as discussed above with FIGS. 3A-3F).

The exemplary editing interface 509 shown in FIG. 5C further includes a save button 512 which, when activated by a user, causes ICE engine 22 to save a revised version of the page (e.g., which may be stored to data storage accessible by ICE engine 22). Also included in editing interface 509 is a cancel button 513 which, when activated by a user, cancels the revisions made to the page since the last save of the page, thereby reverting the page being edited back to an earlier-saved version.

In the exemplary editing interface 509 shown in FIG. 5C, regions of the page that are editable are indicated as such in some way, such as by highlighting the regions. For instance, as mentioned above, editable regions 515 and 516 (which correspond to the regions 302 and 314 discussed above in FIGS. 3A-3H) are highlighted to indicate that they are available to be edited via this run-time editing. In certain embodiments, ICE engine 22 determines, from the ice:editable attributes contained in the source code of the page (e.g., ice:editable attributes 304 and 315 of FIGS. 3A-3H), those regions of the page that are editable, and highlights those regions (or otherwise presents some graphical designation) to indicate that they are editable, as mentioned above.

Figure 5E:
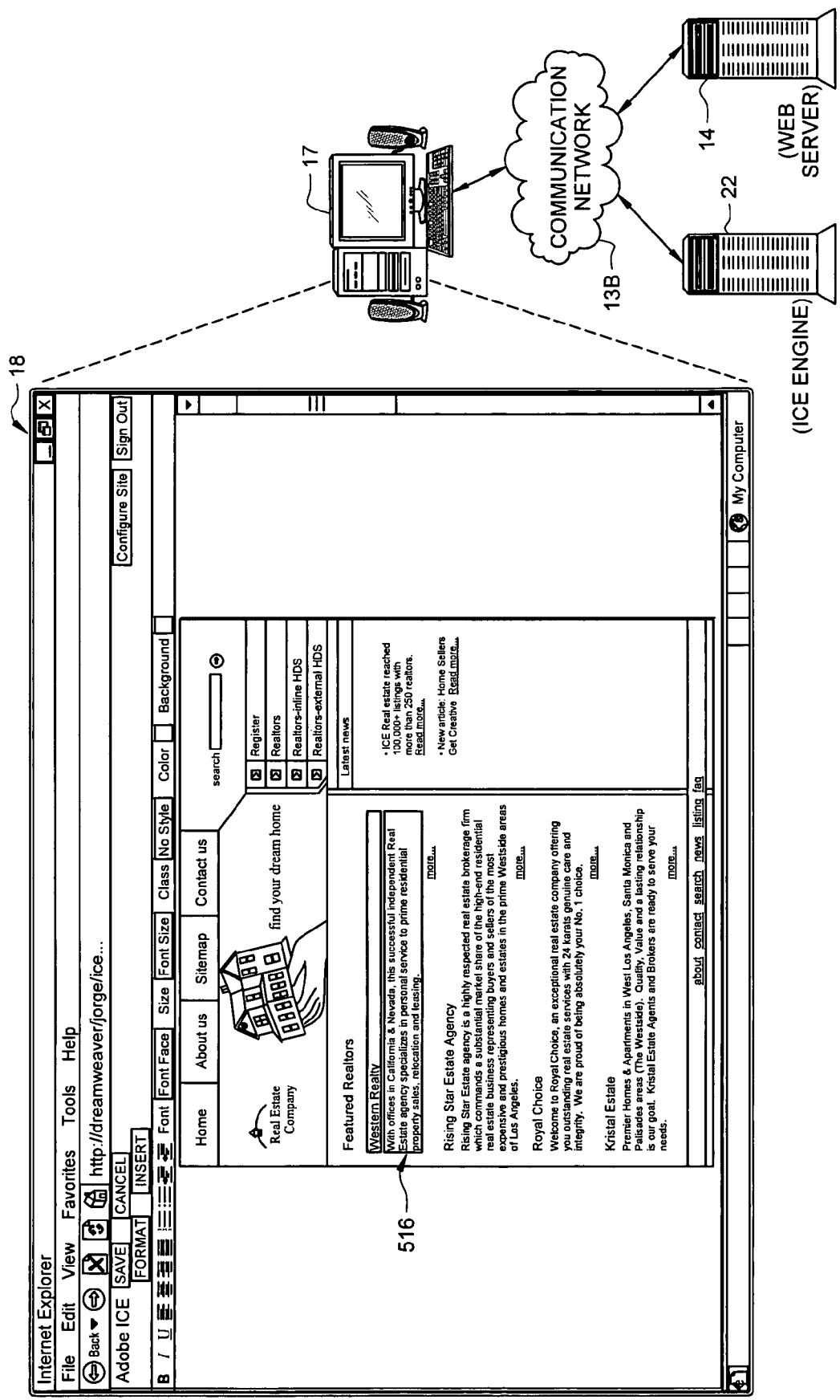

Thus, a user may interact with the output presentation of the web page in this run-time browser interface to edit the content of the page, such as by revising the content of one or more of the editable regions of the page. For instance, in the example shown in FIG. 5D, the user has edited the header region 515 to change this heading text from "Westside Realty" to "Western Realty". The user can perform the editing of such region in the browser in a manner similar to typical editing operations within a wordprocessor, and thus the user need not know any coding language in order to revise the content of the web page's output presentation. Similarly, FIG. 5E shows an example in which the user has modified the descriptive text of editable region 516 of the page's output presentation.

As mentioned above, certain embodiments enable section editing to be defined by the designer (e.g., in the page's source code) as available to the run-time editing user. For instance, as discussed above in the example of FIGS. 3G-3H, the designer has chosen to define a container region 321 that contains various editable sections, wherein each editable section comprises a header portion, a descriptive portion, and a "more" link. For instance, as shown in FIG. 3G, a first section comprises header portion $325_1$, descriptive portion $326_1$, and "more" link $327_1$; and a second section comprises header portion $325_2$, descriptive portion $326_2$, and "more" link $327_2$. Accordingly, returning to FIG. 5F, an example of the run-time editing environment presented to the authorized user for performing the permitted section editing operations is shown. In the illustrative example of FIG. 5F, the section 561 corresponding to the "Royal Choice" agency is shown with section editing controls 562 presented. Section 561 is shown with an outline or border around it to indicate to the user what elements are contained in such section 561. Section editing controls 562 include a "+" button that when activated inserts a new section, a "−" button that when activated removes the selected section 561, an arrow-up button for moving the section 561 upward in the contained list of sections (e.g., to move the Royal Choice agency above the Western Realty section in this example), and an arrow-down button for moving the section 561 downward in the contained list of sections. Thus, ones of the section editing capabilities that are permitted for section 561 (as defined by the page's source code, as discussed above with FIGS. 3G-3H) have corresponding user interface editing controls 562 presented to enable the user to perform the permitted section editing operations. Other editable sections of the page may likewise be shown with section editing controls, and/or such section editing controls may be presented responsive to a user clicking in a section that is defined as editable.

Figure 5F:
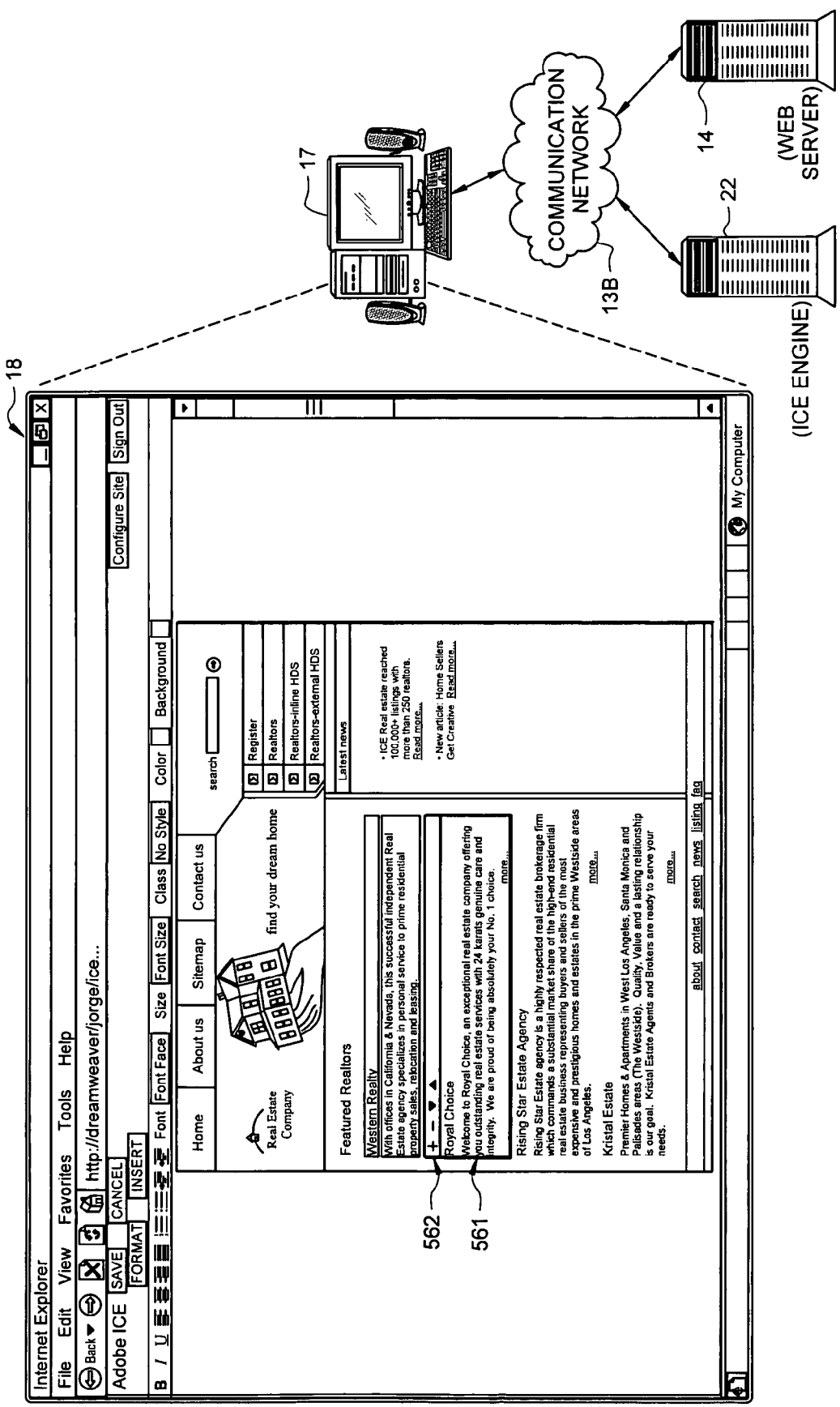
Figure 5G:
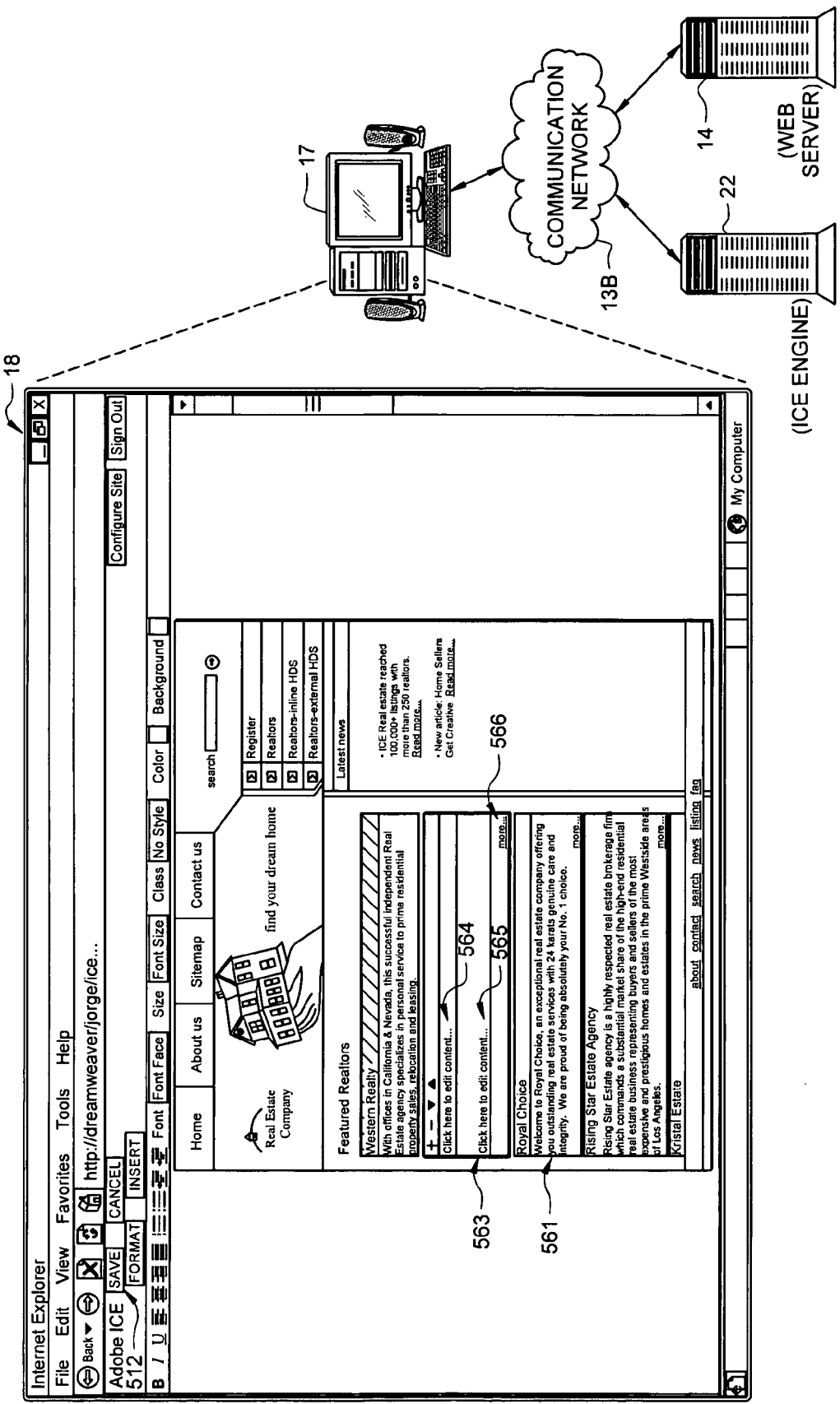

FIG. 5G shows an exemplary new section 563 that is inserted responsive to the user activating the "+" button of section editing controls 562 in FIG. 5F. New section 563 has a consistent look-and-feel (e.g., color scheme, layout, text size and font, etc.) as the other sections in the defined container, such as section 561. Thus, the new section 563 has a header portion 564, a descriptive portion 565, and a "more" link 566. The editing capabilities defined for corresponding regions of section 561 (e.g., the specific edit formatting capabilities, such as bolding, italicizing, etc.) are likewise copied and made available for editing of new section 563. Thus, a user can perform the same editing capabilities (e.g., edit formatting capabilities) for header portion 564 of new section 563 as is permitted to the user for the header portion (e.g., the "Royal Choice" header) of section 561. Thus, the newly added section 563 may be edited to result in the new section for "Rising Star Estate Agency" as shown in FIG. 5H.

Figure 5H:
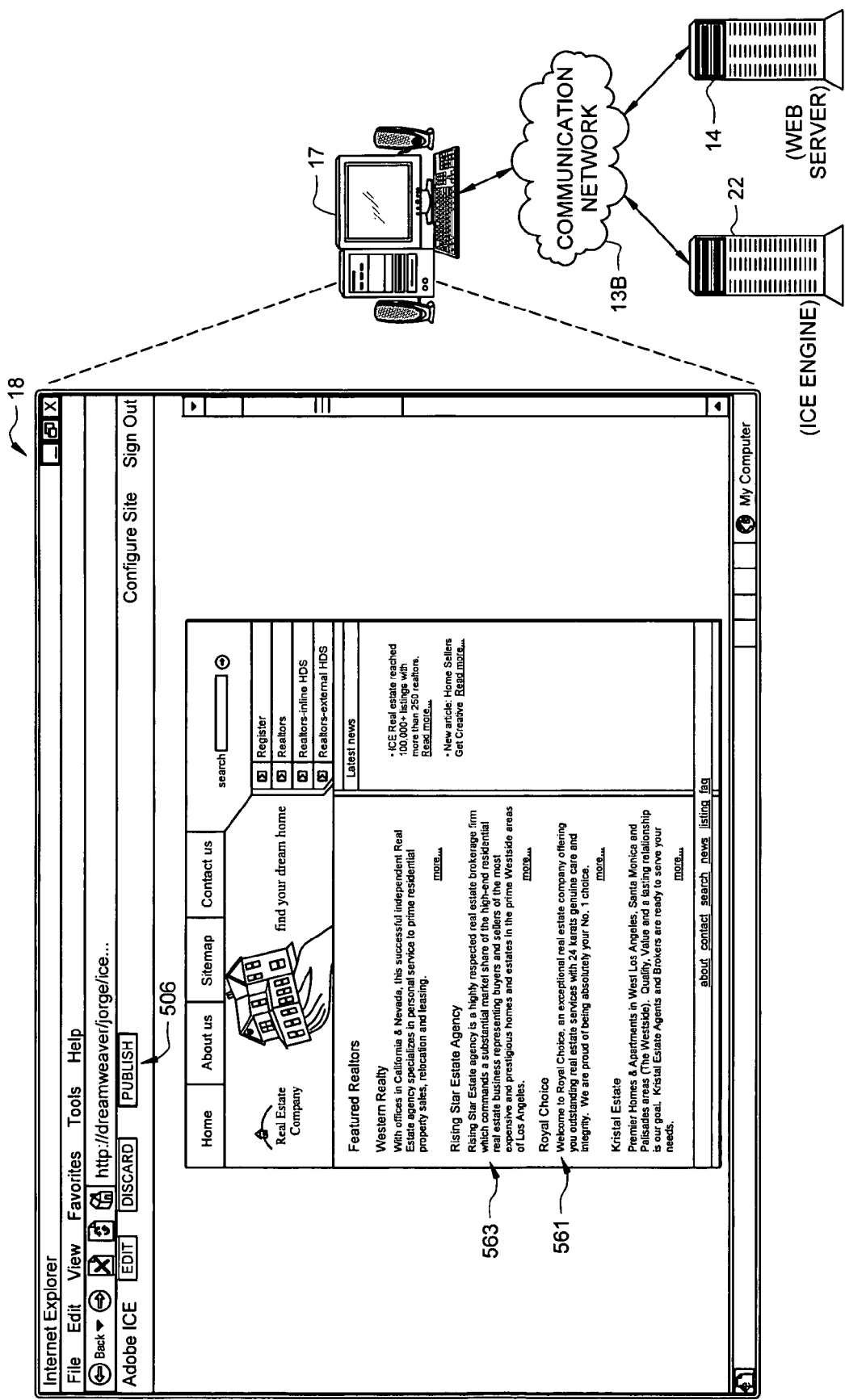
Figure 5I:
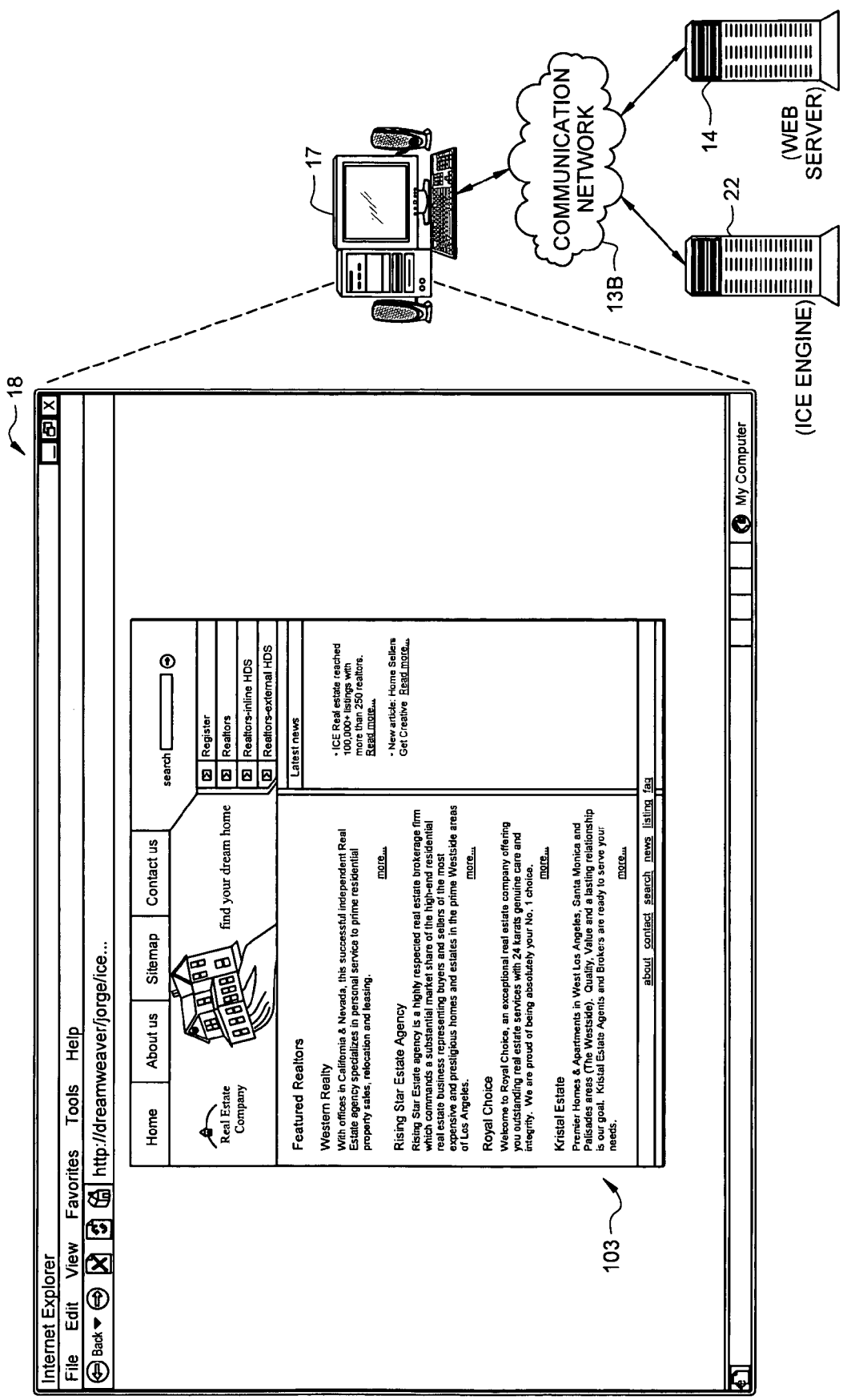

Once the desired edits are made to the content of the page, the user may activate the save button 512 (of FIG. 5G), which saves (e.g., to ICE engine 22) the edited version of the page, as shown in the interface 502 of FIG. 5H. If the user desires for the edited version of the page to become the active, run-time page that is served to clients by hosting web server 14, then the user may activate publish button 506. In response to activation of the publish button 506, the revised page is made the active page being hosted and served to requesting clients by server 14. For instance, in one embodiment, responsive to activation of publish button 506 ICE engine 22 communicates the revised source code to the web server 14 and the web server 14 replaces the previous run-time version of the source code with this new source code such that clients accessing web server 14 are then served the new source code to cause their browser to present the corresponding revised output presentation of the page. Thus, once the revised web page is published to web server 14, clients requesting the web page from hosting web server 14 are served the revised source code, which causes their browser 18 to present the corresponding revised output presentation 103 of the page, such as shown in the example of FIG. 5I.

FIG. 6 shows an exemplary operational flow diagram for an authoring tool 21 according to one embodiment of the present invention. In operational block 61, the authoring tool 21 receives designation of at least one region of an output presentation of a page being authored as being run-time editable. For instance, in the above example of FIGS. 3A-3B, authoring tool 21 receives a selection of a region 302 of the output presentation of a page being authored, and authoring tool 21 receives a command (e.g., via button 303) to designate such region 302 as being run-time editable (or an "ICE Editable Region"). In certain embodiments, as illustrated in sub-block 601, authoring tool 21 further receives designation of one or more of a plurality of editing capabilities to be permitted during run-time editing of the at least one region. For instance, in the above example of FIGS. 3A-3C, authoring tool 21 presents a PI interface 306 which enables a designer to input a selection of any edit formatting capabilities 307 that are to be permitted during run-time editing of the region 302. Additionally, in certain embodiments, the designer may input a command (e.g., via button 322 of FIG. 3G) to designate a container region that contains one or more sections for which run-time section editing capabilities may be defined, as discussed above.

In operational block 62, code that specifies the designated run-time editable nature of the at least one region of the page is included in the source code of the page being authored. For instance, authoring tool 21 may insert code (e.g., ice attributes) into the source code of the page to designate the run-time edit capabilities that are permitted for the at least one region of the page. In the example of FIGS. 3A-3C, for instance, authoring tool 21 inserts ice:editable attribute 304 into the source code that designates the region 302 of the output presentation of the page as being run-time editable. Additionally, authoring tool 21 inserts an ice:editableoption attribute 312 that designates what run-time edit capabilities (e.g., which, if any, of the edit formatting capabilities 307) are permitted during run-time editing of the region 302.

Turning now to FIG. 7, an exemplary operational flow diagram for run-time editing of a page according to one embodiment of the present invention is shown. In operational block 71, a browser 18 receives page source code 202 that defines an output presentation and that includes code defining run-time edit capability for one or more regions of the output presentation. The browser interprets the page source code 202 and presents the defined output presentation 103 in operational block 72. In block 73, the browser receives a command to request run-time editing of content of the output presentation, which is recognized by logic (e.g., ".js" logic that may be residing on the web server 14). In certain embodiments, as shown in sub-block 701, authorization of the requesting user for performing the run-time editing may be determined. For instance, authorization information may be received from the requesting user from which a determination may be made (e.g., by run-time edit engine 22) whether the requesting user is authorized to perform the requested run-time editing, such as discussed above with the example of FIG. 5A.

In operational block 74, a run-time editing engine 22 interprets the code defining run-time edit capability for the output presentation. In operational block 75, the run-time editing engine 22 enables (assuming the requesting user is determined as authorized to perform the requested run-time editing) editing via the browser 18 of the content of the output presentation in accordance with the run-time editing capability defined in the page source code. For instance, in certain embodiments, such as shown in sub-block 702, an ICE client is downloaded to the client's computer for presenting, via the browser 18, a content editing environment (e.g., the exemplary environment discussed above with FIGS. 5B-5H) for enabling editing of the content in accordance with the run-time editing capability defined in the page source code.

In operational block 76, a publish command is received requesting to publish revised content of the output presentation for the page. As discussed above with 5H, such publish command may be input via the content editing environment presented on the browser 18, and such publish command is received by the run-time editing engine 22. In response, in operational block 77 the run-time editing engine 22 publishes to a hosting web server 14 a revised page having source code defining the revised content of the output presentation. That is, revised page source code is published to the hosting web server 14, which replaces the previous source code for the page and becomes the live run-time source code that is served by the hosting web server 14 to clients 17 requesting the page, as discussed above with the example of FIGS. 5H-5I.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 8:
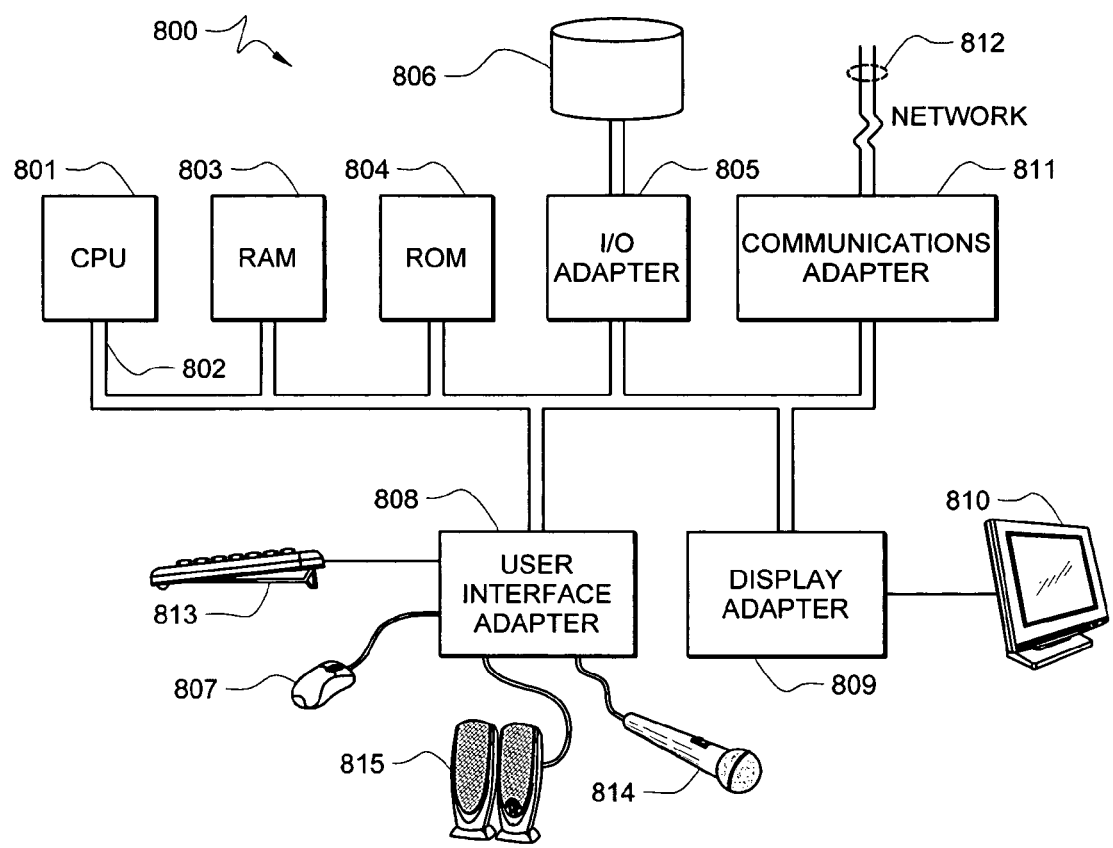
FIG. 8 shows an exemplary system on which embodiments of the present invention may be implemented.

FIG. 8 illustrates an exemplary computer system 800 on which software code authoring tool 21, browser 18, and/or logic of run-time editing engine 22 may be implemented according to one embodiment of the present invention. Thus, computer system 800 may be deployed to implement a designer computer 11 on which authoring tool 21 resides/executes, a client computer 17 on which browser 18 resides/executes, an run-time editing engine 22 on which logic resides/executes for supporting the above-described run-time editing operations, or even a web server 14 which hosts a page's source code 202. Central processing unit (CPU) 801 is coupled to system bus 802. CPU 801 may be any general-purpose CPU. The present invention is not restricted by the architecture of CPU 801 (or other components of exemplary system 800) as long as CPU 801 (and other components of system 800) supports the inventive operations as described herein. CPU 801 may execute the various logical instructions according to embodiments of the present invention. For example, CPU 801 may execute machine-level instructions according to the exemplary operational flows described above in conjunction with FIGS. 6 and 7.

Computer system 800 also preferably includes random access memory (RAM) 803, which may be SRAM, DRAM, SDRAM, or the like. Computer system 800 preferably includes read-only memory (ROM) 804 which may be PROM, EPROM, EEPROM, or the like. RAM 803 and ROM 804 hold user and system data and programs, as is well known in the art.

Computer system 800 also preferably includes input/output (I/O) adapter 805, communications adapter 811, user interface adapter 808, and display adapter 809. I/O adapter 805, user interface adapter 808, and/or communications adapter 811 may, in certain embodiments, enable a user to interact with computer system 800 in order to input information, such as interacting with a user interface of an authoring tool 21 or interacting with an output presentation of a browser 18, as described above.

I/O adapter 805 preferably connects to storage device(s) 806, such as one or more of hard drive, compact disc (CD)

drive, floppy disk drive, tape drive, etc. to computer system 800. The storage devices may be utilized when RAM 803 is insufficient for the memory requirements associated with storing data for operations of the authoring tool 21, browser 18, and/or logic of run-time editing engine 22. Communications adapter 811 is preferably adapted to couple computer system 800 to network 812, which may enable information to be input to and/or output from system 800 via such network 812 (e.g., the Internet or other wide-area network, a local-area network, a public or private switched telephony network, a wireless network, any combination of the foregoing). User interface adapter 808 couples user input devices, such as keyboard 813, pointing device 807, and microphone 814 and/or output devices, such as speaker(s) 815 to computer system 800. Display adapter 809 is driven by CPU 801 to control the display on display device 810 to, for example, display information pertaining to an application under development, such as code view 101 and/or design view 102 of authoring tool 21, and/or to display presentation output of a page via a browser 18 (including the run-time editing environment provided to the browser by run-time editing engine 22, as discussed above with FIGS. 5A-5G), according to certain embodiments of the present invention.

It shall be appreciated that the present invention is not limited to the architecture of system 800. For example, any suitable processor-based device may be utilized for implementing authoring tool 21, browser 18, and/or run-time editing engine 22, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
  receiving, by an authoring tool, a web page comprising markup;
  in response to receiving, by the authoring tool, a first input indicating selection of a region of the web page, selecting the region of the web page;
  in response to receiving, by the authoring tool, a second input indicating that the selected region should be run-time editable, updating the markup to configure the region of the web page to be run-time editable when the web page is rendered by a web browser;
  presenting, by the authoring tool, a plurality of potential editing options for the selected region; and
  in response to receiving, by the authoring tool, a third input indicating selection of at least one of the plurality of potential editing options that should be permitted for the selected region, updating the markup to configure the selected editing options to be permitted when the region is run-time edited within the web browser;
  wherein the region of the web page, when received by the authoring tool, is not configured to be run-time editable.

2. The method of claim 1, wherein the authoring tool comprises a design view and a code view, wherein the design view comprises a graphical representation of the web page and the code view comprises a textual representation of the web page.

3. The method of claim 2, wherein in response to receiving, by the authoring tool, the first input indicating selection of the region of the web page, selecting the region of the web page comprises:
  receiving the first input in the code view, the first input indicating selection of a portion of the textual representation of the web page corresponding to the region; and
  highlighting the portion of the textual representation of the web page corresponding to the region.

4. The method of claim 2, wherein in response to receiving, by the authoring tool, the first input indicating selection of the region of the web page, selecting the region of the web page comprises:
  receiving the first input in the design view, the first input indicating selection of a portion of the graphical representation of the web page corresponding to the region; and
  highlighting the portion of the graphical representation of the web page corresponding to the region.

5. The method of claim 2, wherein in response to receiving, by the authoring tool, the first input indicating selection of the region of the web page, selecting the region of the web page comprises:
  receiving the first input in one of the design view and the code view;
  highlighting a first portion of the textual representation of the web page corresponding to the region; and
  highlighting a second portion of the graphical representation of the web page corresponding to the region.

6. The method of claim 2, further comprising:
  in response to receiving, by the authoring tool, the second input, updating the design view to display an outline around a portion of the graphical representation of the web page corresponding to the region.

7. The method of claim 1, wherein updating the markup to configure the region of the web page to be run-time editable comprises:
  including a unique identification within the markup that uniquely identifies the region.

8. The method of claim 1, wherein the plurality of potential editing options comprises edit formatting capabilities.

9. The method of claim 1, wherein the authoring tool is different from the web browser.

10. The method of claim 1, wherein the region comprises a plurality of regions of the web page and wherein the plurality of potential editing options includes at least one of:
  adding a new region within the plurality of regions;
  removing at least one of the plurality of regions; and
  reordering at least one of the plurality of regions.

11. The method of claim 1, further comprising:
updating, by the authoring tool, the markup to enable run-time editing of at least the region of the web page when a predefined key sequence is received by the web browser.

12. The method of claim 1, further comprising:
updating, by the authoring tool, the markup to configure non-editable regions of the web page to be shaded when the region of the web page is run-time edited within the web browser.

13. The method of claim 12, further comprising:
updating, by the authoring tool, the markup to configure the region of the web page to be shaded when the region of the web page is run-time edited within the web browser, wherein the shading for the non-editable regions of the web page is different than the shading for the region of the web page.

14. The method of claim 1, further comprising:
in response to receiving, by the authoring tool, a fourth input indicating that the selected region should not be run-time editable, updating the markup to configure the region of the web page to not be run-time editable when the web page is rendered by the web browser.

15. A non-transitory computer-readable medium comprising program code for an authoring tool, comprising:
program code for receiving, by the authoring tool, a web page comprising markup;
program code for in response to receiving, by the authoring tool, a first input indicating selection of a region of the web page, selecting the region of the web page;
program code for in response to receiving, by the authoring tool, a second input indicating that the selected region should be run-time editable, updating the markup to configure the region of the web page to be run-time editable when the web page is rendered by a web browser;
program code for presenting, by the authoring tool, a plurality of potential editing options for the selected region; and
program code for in response to receiving, by the authoring tool, a third input indicating selection of at least one of the plurality of potential editing options that should be permitted for the selected region, updating the markup to configure the selected editing options to be permitted when the region is run-time edited within the web browser;
wherein the region of the web page, when received, is not configured to be run-time editable.

16. The non-transitory computer-readable medium of claim 15, wherein program code for the authoring tool comprises:
program code for a design view, wherein the design view comprises a graphical representation of the web page
program code for a code view, wherein the code view comprises a textual representation of the web page.

17. The non-transitory computer-readable medium of claim 16, wherein program code for in response to receiving, by the authoring tool, the first input indicating selection of the region of the web page, selecting the region of the web page comprises:
program code for receiving the first input in one of the design view and the code view;
program code for highlighting a first portion of the textual representation of the web page corresponding to the region; and program code for highlighting a second portion of the graphical representation of the web page corresponding to the region.

18. The non-transitory computer-readable medium of claim 15, wherein the authoring tool is different from the web browser.

19. The non-transitory computer-readable medium of claim 15, wherein the region comprises a plurality of regions of the web page and wherein program code for presenting, by the authoring tool, the plurality of potential editing options for the selected region comprises program code for at least one of:
adding a new region within the plurality of regions;
removing at least one of the plurality of regions; and
reordering at least one of the plurality of regions.

20. The non-transitory computer-readable medium of claim 15, further comprising:
program code for updating, by the authoring tool, the markup to enable run-time editing of at least the region of the web page when a predefined key sequence is received by the web browser.

21. The non-transitory computer-readable medium of claim 15, further comprising:
program code for updating, by the authoring tool, the markup to configure non-editable regions of the web page to be shaded when the region of the web page is run-time edited within the web browser.

22. A system comprising:
at least one input device;
a display;
a memory; and
a processor in communication with the at least one input device, the display, and the memory, the processor configured for:
receiving a web page comprising markup;
in response to receiving a first input from the at least one input device indicating selection of a region of the web page, selecting the region of the web page;
in response to receiving a second input from the at least one input device indicating that the selected region should be run-time editable, updating the markup to configure the region of the web page to be run-time editable when the web page is rendered by a web browser;
presenting a plurality of potential editing options for the selected region to the display; and
in response to receiving a third input from the at least one input device indicating selection of at least one of the plurality of potential editing options that should be permitted for the selected region, updating the markup to configure the selected editing options to be permitted when the region is run-time edited within the web browser;
wherein the region of the web page, when received, is not configured to be run-time editable.

23. The system of claim 22, wherein the processor is further configured for:
presenting a design view to the display, wherein the design view comprises a graphical representation of the web page; and
presenting a code view to the display, wherein the code view comprises a textual representation of the web page.

24. The system of claim 23, wherein in response to receiving the first input indicating selection of the region of the web page, selecting the region of the web page comprises:
receiving the first input in the code view, the first input indicating selection of a portion of the textual representation of the web page corresponding to the region; and highlighting the portion of the textual representation of the web page corresponding to the region.

25. The system of claim 23, wherein in response to receiving the first input indicating selection of the region of the web page, selecting the region of the web page comprises:
   receiving the first input in one of the design view and the code view;
   highlighting a first portion of the textual representation of the web page corresponding to the region; and
   highlighting a second portion of the graphical representation of the web page corresponding to the region.

26. The system of claim 22, wherein the region comprises a plurality of regions of the web page and wherein the plurality of potential editing options comprises adding a new region within the plurality of regions, removing at least one of the plurality of regions, and reordering at least one of the plurality of regions.

27. The system of claim 22, wherein the processor is further configured for:
   updating the markup to enable run-time editing of at least the region of the web page when a predefined key sequence is received by the web browser.

28. The system of claim 22, wherein the processor is further configured for:
   updating the markup to configure non-editable regions of the web page to be shaded when the region of the web page is run-time edited within the web browser.

* * * * *